United States Patent
Ohmi et al.

(10) Patent No.: US 8,714,188 B2
(45) Date of Patent: *May 6, 2014

(54) METHOD FOR WATER HAMMERLESS OPENING OF FLUID PASSAGE, AND METHOD FOR SUPPLYING CHEMICAL SOLUTIONS AND DEVICE FOR WATER HAMMERLESS OPENING FOR WHICH THE METHOD IS USED

(75) Inventors: Tadahiro Ohmi, Miyagi (JP); Kouji Nishino, Osaka (JP); Masaaki Nagase, Osaka (JP); Ryousuke Dohi, Osaka (JP); Nobukazu Ikeda, Osaka (JP); Ryutaro Nishimura, Osaka (JP)

(73) Assignees: Fujikin Incorporated, Osaka (JP); Tadahiro Ohmi, Miyagi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,715

(22) Filed: Sep. 22, 2011

(65) Prior Publication Data
US 2013/0000737 A1    Jan. 3, 2013

Related U.S. Application Data

(62) Division of application No. 12/422,136, filed on Apr. 10, 2009, now Pat. No. 8,047,225, which is a division of application No. 10/597,343, filed as application No. PCT/JP2005/000264 on Jan. 13, 2005, now Pat. No. 7,849,869.

(30) Foreign Application Priority Data

Jan. 20, 2004   (JP) .................. 2004-011497

(51) Int. Cl.
  *G05D 7/06*   (2006.01)
(52) U.S. Cl.
  USPC ............... 137/487.5; 137/488; 137/624.12; 137/624.2

(58) Field of Classification Search
  USPC ............... 137/487.5, 488, 624.11, 2, 12, 14, 137/624.12, 624.18, 624.2
  See application file for complete search history.

(56) References Cited

U.S. PATENT DOCUMENTS

| 5,409,037 A | 4/1995 | Wheeler et al. |
| 5,732,929 A | 3/1998 | Luppino et al. |

(Continued)

FOREIGN PATENT DOCUMENTS

| EP | 0877 310 A1 | 11/1998 |
| JP | 50-2075 B1 | 1/1975 |

(Continued)

OTHER PUBLICATIONS

International Search Report issued in the corresponding application PCT/JP2005/000264, completed Apr. 8, 2005, mailed Apr. 26, 2005.

(Continued)

*Primary Examiner* — William McCalister
(74) *Attorney, Agent, or Firm* — Griffin & Szipl, P.C.

(57) ABSTRACT

The water hammerless opening device comprises an actuator operating type valve installed on the fluid passage, an electro-pneumatic conversion device to supply the 2-step actuator operating pressure Pa to the afore-mentioned actuator operating type valve, a vibration sensor removably fixed to the pipe passage on the upstream side of the actuator operating type valve, and a tuning box to which the vibration detecting signal Pr detected by the vibration sensor is inputted, through which the control signal Sc to control the step operating pressure Ps' of the afore-mentioned 2-step actuator operating pressure Pa is outputted to the electro-pneumatic conversion device, and with which the 2-step actuator operating pressure Pa, of the step operating pressure Ps' which makes the vibration detecting signal Pr nearly zero, is outputted from the electro-pneumatic conversion by adjusting the control signal Sc.

2 Claims, 19 Drawing Sheets

(56) References Cited

U.S. PATENT DOCUMENTS

| | | |
|---|---|---|
| 5,941,500 A | 8/1999 | Lebkuchner |
| 5,970,430 A * | 10/1999 | Burns et al. .................. 702/122 |
| 6,102,072 A | 8/2000 | Yokota et al. |
| 6,178,997 B1 | 1/2001 | Adams et al. |
| 6,192,321 B1 | 2/2001 | Grumstrup et al. |
| 6,745,997 B2 | 6/2004 | Moeller et al. |
| 6,889,706 B2 | 5/2005 | Fukano et al. |
| 7,080,658 B2 * | 7/2006 | Ohmi et al. ................. 137/487.5 |
| 7,278,437 B2 | 10/2007 | Ohmi et al. |
| 2002/0011762 A1 | 1/2002 | Klenk et al. |
| 2008/0035877 A1 | 2/2008 | Ohmi et al. |
| 2008/0257415 A1 | 10/2008 | Ohmi et al. |

FOREIGN PATENT DOCUMENTS

| | | |
|---|---|---|
| JP | 55-119923 | 8/1980 |
| JP | 59-45378 | 3/1984 |
| JP | 60-8388 B2 | 3/1985 |
| JP | 60-208677 A | 10/1985 |
| JP | 62113976 A | 5/1987 |
| JP | 63-115208 A | 5/1988 |
| JP | 11-82763 A2 | 3/1993 |
| JP | 7-190235 | 7/1995 |
| JP | 9-502292 A | 3/1997 |
| JP | 2547366 Y2 | 9/1997 |
| JP | 11-118049 | 4/1999 |
| JP | 2000-10602 A | 1/2000 |
| JP | 2000-074254 A | 3/2000 |
| JP | 2002-295705 A2 | 10/2002 |
| JP | 2004-213638 A | 7/2004 |
| JP | 2004-316679 A | 11/2004 |

OTHER PUBLICATIONS

Waterhammer, A Complex Phenomenon With a Simple Solution, Downloaded May 2006 from www.omega.com, 3 pages.

Office Action issued in related co-pending U.S. Appl. No. 11/762,987, dated Dec. 18, 2008.

Z. Michael Lahlou, Water Hammer, Tech Brief 2003.

Khalid Ei-Darymli et al., Reliability Modeling of Wireless Sensor Network for Oil and Gas Pipelines Monitoring, 106 Sensors & Transducers Journal 6-26 (2009).

Dipen N. Sinha, Acoustic Sensor for Pipeline Monitoring: Technology Report (Los Alamos National Laboratory 2005).

Masanobu Shinozuka et al., Nondestructive Monitoring of a Pipe Network using a MEMS-Based Wireless Network, at www.ece.uci.edu/~chou/spie10.pdf (downloaded Mar. 25, 2013).

* cited by examiner

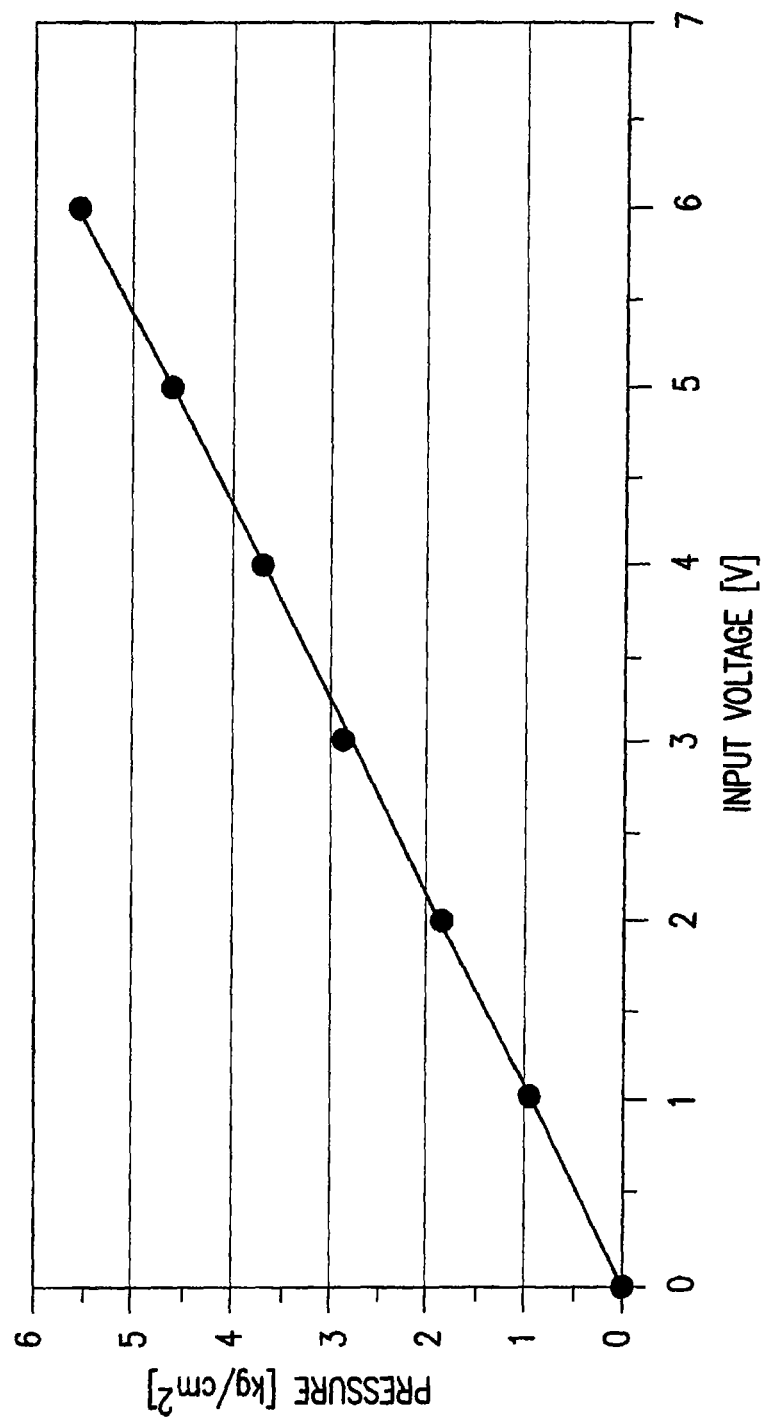

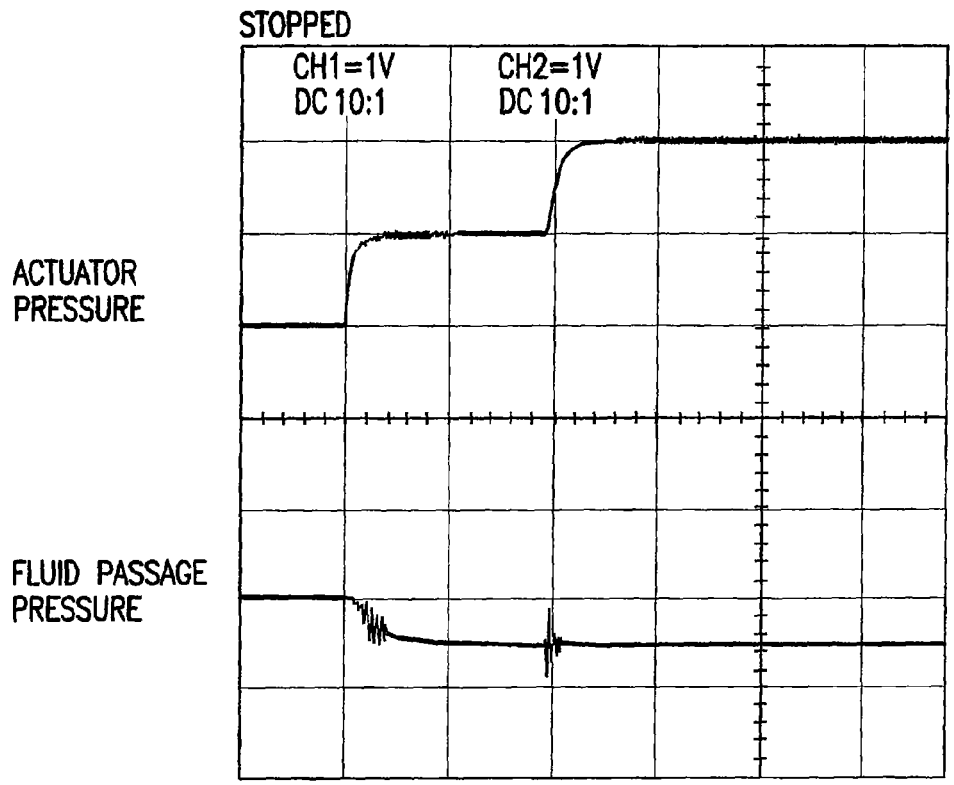
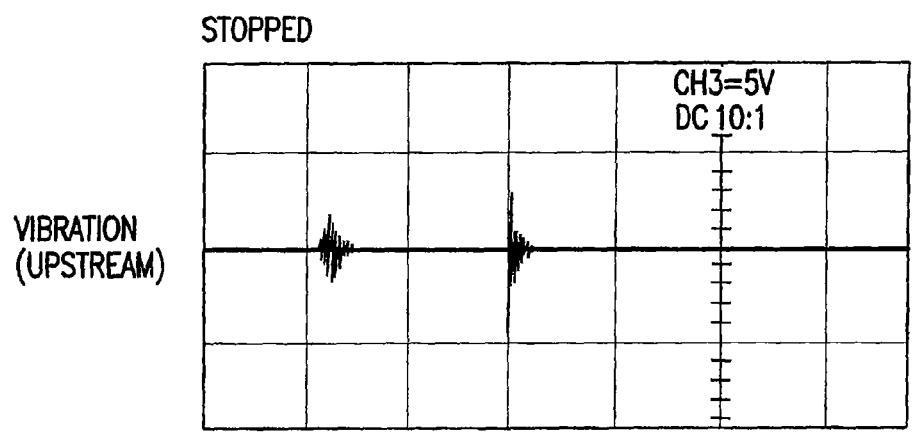
FIG.5a

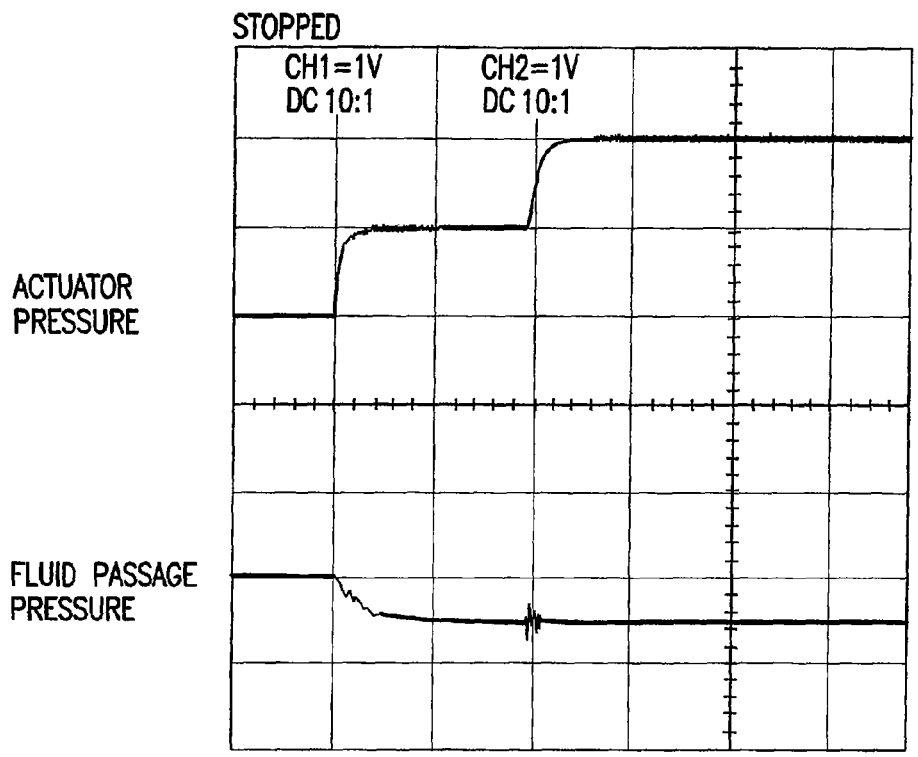
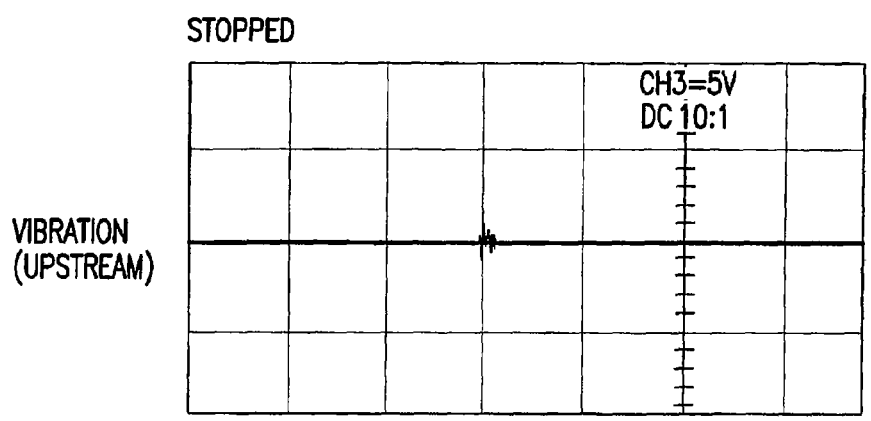
FIG.5b

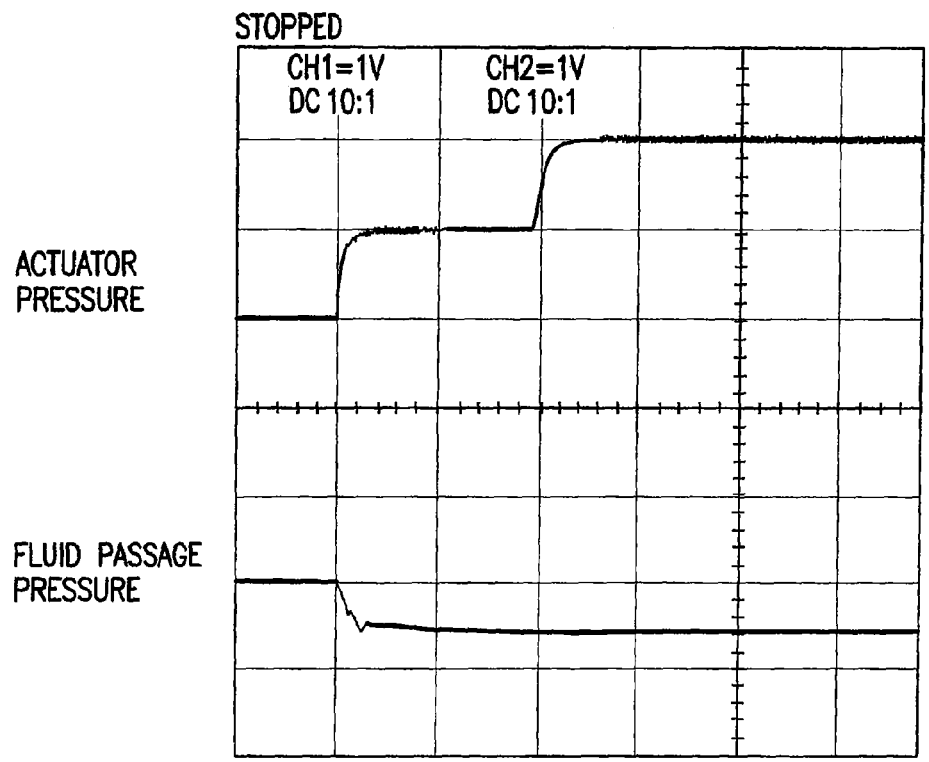
ACTUATOR PRESSURE
FLUID PASSAGE PRESSURE
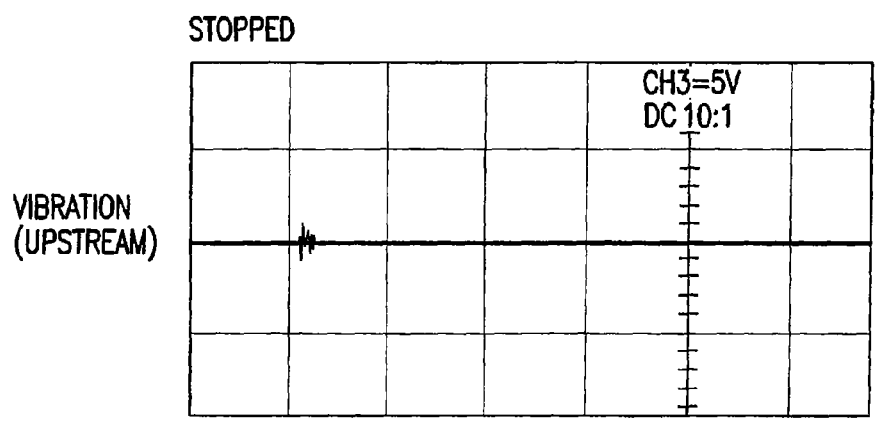
VIBRATION (UPSTREAM)
FIG.5c

METHOD FOR WATER HAMMERLESS OPENING OF FLUID PASSAGE, AND METHOD FOR SUPPLYING CHEMICAL SOLUTIONS AND DEVICE FOR WATER HAMMERLESS OPENING FOR WHICH THE METHOD IS USED

This application is a divisional application of U.S. patent application Ser. No. 12/422,136, which was filed on Apr. 10, 2009, which is a divisional application of U.S. patent application Ser. No. 10/597,343 (now U.S. Pat. No. 7,849,869), which was filed on Jul. 20, 2006 as the National Phase Application in the United States of International Patent Application No. PCT/JP2005/000264 filed Jan. 13, 2005, which claims priority on Japanese Patent Application No. 2004-011497, filed Jan. 20, 2004. The entire disclosures of the above patent applications are hereby incorporated by reference.

FIELD OF THE INVENTION

The present invention is concerned with improvements in a water hammer prevention system with which the water hammer effect is completely prevented when promptly opening a fluid passage, and is more specifically concerned with a method for water hammerless opening of a fluid passage, a method for feeding chemical solutions, and a device for water hammerless opening for which the method is used so that the fluid passage is opened quickly and surely without causing the occurrence of a water hammer effect on the upstream side of the fluid passage irrespective of the degree of the fluid pressure involved.

BACKGROUND OF THE INVENTION

It has been widely known that when a passage through which a liquid, such as water or the like, passes is abruptly closed there occurs the so-called water hammer with which the pressure rises inside the passage on the upstream side of the closed point in a vibratory manner, thereby causing various problems such as the breakdown of devices or instruments connected to the passage due to the water hammer.

Thus, various techniques have been developed to prevent the occurrence of a water hammer. However, these techniques basically employ either one of the following methods, that is: (1) the time for closing a fluid passage is set to be slightly longer, or (2) the vibrating pressure generated inside of the passage is released to the outside by opening a bypass passage, or is absorbed by a separately installed accumulator. The former method is found to be time-consuming for closing the fluid passage, thus resulting in failure to meet the need for prompt closing of the passage, while according to the latter method, the added costs for the bypass passage or the accumulator attachments is too high.

The afore-mentioned issues regarding the water hammer effect have been discussed in those industrial fields where fluid involves a relatively large flow quantity. In recent years, however, in fields where a small flow quantity is involved, for example, in a field where wafer cleaning in semiconductor manufacturing or chemical products manufacturing are encountered, it has become very important to prevent the occurrence of a water hammer at the time of urgent closure of supplied fluid in order to improve maintenance of facilities, improve product quality, and, further, achieve upgrading of so-called throughput characteristics in the manufacturing process.

Patent Document 1: Toku-Kai-Hei No. 7-190235 Public Bulletin
Patent Document 2: Toku-Kai No. 2000-10602 Public Bulletin
Patent Document 3: Toku-Kai No. 2002-295705 Public Bulletin On the other hand, the inventors of the present invention have developed and disclosed techniques to solve the aforementioned problems related to conventional techniques for preventing the occurrence of the water hammer effect, namely, (1) not being able to cope fully with urgent passage closure without basically setting a slightly longer a closing time of the fluid passage, and (2) not being able to cope fully with the rising facilities' costs incurred by adding measures that basically absorb or release the vibrating pressure. Thus, the present invention makes it possible to abruptly close a fluid passage quickly and surely at low cost and without generating a water hammer. In particular, the techniques of the present invention allow a fluid passage to be abruptly closed without the occurrence of a water hammer and, in an extremely short lapse of time (for example, within 1000 msec), by performing closure of a valve provided on the fluid passage by means of multi-step closing operations. Also, the techniques of the present invention determine the conditions for closing the valve in advance of actual closure, and in order to make it possible for the fluid passage to close without a water hammer forming, by actually conducting valve closing tests so that the actuator of the valve body is operated by an electro-pneumatic conversion device in which valve closing conditions are stored. Thus, water hammerless closing of the fluid passage is achieved quickly and surely.

OBJECT OF THE INVENTION

Water hammerless closing techniques for a fluid passage have previously been developed by inventors of the present invention and allow the fluid passage to be abruptly closed, quickly and surely, without causing a water hammer effect, thus achieving excellent practical effects.

However, in recent years, in fields such as the semiconductor manufacturing facility industry, the chemical and pharmaceutical industries, and the like, there has been a strong desire to reliably prevent the water hammer effect at the time when the fluid passage is abruptly opened and not only at the time when the fluid passage is abruptly closed. The conventional measure for preventing a water hammer at the time of abrupt closure of the fluid passage has not been found to be sufficient. The reason is that when a water hammer occurs at the time of opening the fluid passage, various difficulties, such as moving of particles into the fluid passage and the like, arise.

Due to the recent trend wherein semiconductor cleaning devices, and the like, employ cleaning equipment with which wafers are now treated one by one (a single wafer processing cleaner), it has become important not only that quality improvements in the liquid supply system are achieved, but also that the time required for each process of cleaning is shortened to improve so-called throughput characteristics. Furthermore, with use of the afore-mentioned new treatment-type semiconductor manufacturing facility, it becomes inevitable that the frequency of valves opening and closing increases because wafers are treated singly. Therefore, there is a need for stable water hammerless valve opening and closing methods. As such, it has become a strict requirement that a liquid supply system does not cause pressure fluctuations while wafers are processed.

It is an object of the present invention to solve the afore-mentioned problems encountered with semiconductor manufacturing facilities, cleaning equipment and the like, and to provide a method for water hammerless opening of a fluid passage, and a method for the supply of liquid, and a device for water hammerless opening, for which the method is used so that the fluid supply passage is surely and abruptly opened in a state of water hammerlessness.

SUMMARY OF THE INVENTION

Inventors of the present invention have conceived of how to open a valve by a multi-step method, in which a valve body of the valve blocking the passage is rapidly moved to a prescribed position before reaching the full opening position, and then, the valve body is moved to the full opening position after a short lapse of time. At the same time, a number of analytical tests were conducted by the inventors on the mechanism of how a water hammer occurs by employing the method of the present invention for opening the valve. From the results of the afore-mentioned tests, the inventors of the present invention have learned how to prevent the occurrence of the water hammer effect by making the stopping position of the valve body at a first step come within a specified range when the valve is first opened.

The present invention has been created based on the afore-mentioned findings. The present invention, in accordance with a first method embodiment, is fundamentally constituted so that, with the method by which the fluid passage is made open by means of the actuator operating type valve provided on the fluid passage having a nearly constant pressure inside the pipe passage, first the valve body is moved toward the direction of the valve opening by increasing or decreasing to the prescribed set value the afore-mentioned driving input to the actuator, and the driving input to the actuator is held at the afore-mentioned set value for a short period of time, and then, the driving input is further increased or reduced to place the valve in a state of full opening, thus the fluid passage is opened without causing a water hammer.

The present invention in accordance with a second method embodiment, which further modifies the first method embodiment, is made so that the valve is a normally closed and pneumatic pressure operating type diaphragm valve, or a normally closed and pneumatic pressure operating type diaphragm valve which is of the fixed capacity type with the inner capacity of the valve not changing when the valve is operated.

The present invention in accordance with a third method embodiment, which further modifies the first method embodiment, is made so that the time for holding the driving input to the actuator at the set value for a short period of time is made to be less than 1 second, and the pressure rise value of the fluid passage is made to be within 10% of the pressure value before the valve is made to open.

The present invention in accordance with a first apparatus embodiment is fundamentally constituted so that a device for water hammerless opening of a fluid passage comprises a valve body, an actuator to drive the valve body, a vibration sensor removably fixed to the pipe passage on the upstream side of the valve body, an electro-pneumatic conversion control device to which a valve opening/closing command signal is inputted and with which the actuator operating pressure Pa inputted to the actuator is controlled by a control signal Sc stored in a data storage part in advance, and a computation control device equipped with a comparison computation circuit to which a vibration detecting signal Pr from the afore-mentioned vibration sensor, a step pressure setting signal Ps to be supplied to the actuator, a step pressure holding time setting signal Ts, and a permissible upper limit vibration pressure setting signal Prm are inputted, and with which the afore-mentioned vibration detecting signal Pr and the permissible upper limit vibration pressure setting signal Prm are compared, and the afore-mentioned step pressure setting signal is adjusted, thus outputting the control signal Sc consisting of the afore-mentioned holding time setting signal Ts and adjusted step pressure setting signal Ps to the data storage part of the afore-mentioned electro-pneumatic conversion control device.

The present invention in accordance with a second apparatus embodiment, which further modifies the first apparatus embodiment, is constituted so that the computation control device comprises a step pressure setting circuit, a holding time setting circuit, a permissible upper limit vibration pressure setting circuit, a vibration pressure detecting circuit and a comparison computation circuit; and, when the vibration detecting signal Pr exceeds the permissible upper limit vibration pressure setting signal Prm immediately after the actuator operating signal is step-changed, the step pressure setting signal Ps is adjusted toward the rising direction, and when the vibration detecting signal Pr exceeds the permissible upper limit vibration pressure setting signal Prm immediately after the actuator operating pressure is made to zero from the intermediate step operating pressure, the step pressure setting signal Ps is adjusted toward the lowering direction.

The present invention in accordance with a third apparatus embodiment, which further modifies the first apparatus embodiment, is constituted so that an electro-pneumatic conversion device comprises a data storage part that stores the control signal Sc from the computation control device, a signal conversion part and an electro-pneumatic conversion part; the actuator operating pressure control signal Se is outputted from the signal conversion part to the electro-pneumatic conversion part based on the control signal Sc' stored in the data storage part in advance so that no water hammer is caused.

The present invention in accordance with a fourth apparatus embodiment is fundamentally constituted so that a device for water hammerless opening of a fluid passage comprises an actuator operating type valve installed on the fluid passage, an electro-pneumatic conversion device to supply a 2-step actuator operating pressure Pa to the actuator operating type valve, a vibration sensor removably fixed to the pipe passage on the upstream side of the afore-mentioned actuator operating type valve, and a tuning box to which the vibration detecting signal Pr detected through the vibration sensor is inputted, and from which the control signal Sc is outputted to the electro-pneumatic conversion device to control the step operating pressure Ps' of the afore-mentioned 2-step actuator operating pressure Pa, and to output the 2-step actuator operating pressure Pa of the step operating pressure Ps', which makes the vibration detecting signal Pr nearly zero, from the electro-pneumatic conversion device by adjusting the control signal Sc.

The present invention in accordance with a fourth method embodiment is fundamentally constituted so that, with the method for opening a fluid passage for which a vibration sensor is removably fixed on the upstream side of the actuator operating type valve installed on the fluid passage, and the vibration detecting signal Pr is inputted to the tuning box, and then, the control signal Sc from the tuning box is inputted to the electro-pneumatic conversion device, thus the 2-step actuator operating pressure Pa generated in the electro-pneumatic conversion device by the afore-mentioned control signal Sc is supplied to the actuator so that the actuator operating type valve is made to open in the 2-step operation, the 2-step actuator operating pressure Pa supplied to the actuator and the vibration detecting signal Pr are compared for the relative relation of the two, and if vibration is generated at the time when the first step actuator operating pressure Pa rises, the step operating pressure Ps' is lowered, and if vibration is generated at the time when the second step actuator operating pressure Pa rises, the step operating pressure Ps' is raised, and the step operating pressure Ps', of the step operating pressure Pa to make the vibration detecting signal Pr nearly zero, is determined by repeating a plurality of adjustments of raising or lowering the afore-mentioned step operating pressure Ps' so that the afore-mentioned actuator operating type valve is opened based on data on the control signal Sc when the 2-step operating pressure Pa of the step operating pressure Ps' is outputted from the electro-pneumatic conversion device to make generation of vibration nearly zero.

The present invention in accordance with a fifth method embodiment is fundamentally constituted so that, using the method for opening a fluid passage for which a vibration sensor is removably fixed on the upstream side of the actuator operating type valve installed on the fluid passage, the vibration detecting signal Pr is inputted to the tuning box, and then, the control signal Sc from the tuning box is inputted to the electro-pneumatic conversion device. Thus, the 2-step actuator operating pressure Pr generated by the electro-pneumatic conversion device by the afore-mentioned control signal Sc is supplied to the actuator so that the actuator operating type valve is made to open in the 2-step operation, and the 2-step actuator operating pressure Pa supplied to the actuator and the vibration detecting signal Pr are compared for the relative relation of the two, and if vibration is generated at the time when the first step actuator operating pressure Pa drops, then the step operating pressure Ps' is raised, and if vibration is generated at the time when the second step actuator operating pressure Pa drops, then the step operating pressure Ps' is lowered, and the step operating pressure Ps' of the step operating pressure Pa is determined to make the vibration detecting signal Pr nearly zero by repeating a plurality of adjustments of raising or lowering of the afore-mentioned step operating pressure Ps' so that the afore-mentioned actuator operating type valve is opened based on data on the control signal Sc when the 2-step operating pressure Pa of the step operating pressure Ps' is outputted from the electro-pneumatic conversion device to make the generation of vibration nearly zero.

The present invention in accordance with a sixth method embodiment, which further modifies the fourth and fifth method embodiments, is made so that the vibration sensor and tuning box can be removed after data on the control signal Sc, at the time of outputting the 2-step operating pressure Pa with which generation of vibration is nearly zero, are inputted to the memory storage of the electro-pneumatic conversion device.

The present invention in accordance with a seventh method embodiment, which further modifies the fourth and fifth method embodiments, is made so that the vibration sensor is provided at a position on the upstream side within 1000 mm from the place where the actuator operating type valve is installed.

The present invention in accordance with an eighth method embodiment, which further modifies the fourth and fifth method embodiments, is made so that the step operating pressure holding time t of the 2-step operating pressure Pa is set at less than 1 second.

The present invention in accordance with a ninth method embodiment is made so that, employing the method with which a fluid is supplied to the fluid passage on the downstream side by opening the fluid passage by means of the actuator operating type valve installed on the fluid passage and having a nearly constant internal pressure therein, a chemical solution is used for fluid, and first, the valve body is moved toward the direction of valve opening by increasing or decreasing the afore-mentioned driving input to the actuator to the prescribed set value, and the actuator driving input is held at the afore-mentioned set value for a short period of time, and second, the driving input is further increased or decreased to make the valve in a state of full opening so that a water hammer does not occur at the time the valve is opened.

The present invention in accordance with a tenth method embodiment, which modifies the ninth method embodiment, is made so that the time the actuator driving input is to be held at the set value is made to be less than 1 second, and the pressure rise value of the fluid passage is made to be within 10% of the pressure value before the valve is opened.

Effects of the Invention

Employing the method of the present invention, it is possible to abruptly open a fluid passage in an extremely short period of time (e.g., within 300~1000 m sec.) without causing a water hammer because the valve can be opened in a manner that, in the case where fluid pressure is constant, the driving force to the actuator is held at the set value to move the valve body to the prescribed position and to halt once for a short period of time. Then, the valve body is moved to the full opening position, thus making the set value for the afore-mentioned driving force a value in the appropriate range.

The water hammerless opening device, according to the present invention, is constituted so that water hammerless valve opening is achieved by a vibration sensor 18 that is removably fixed to the pipe passage L1, wherein the vibration detecting signal Pr is detected by the vibration sensor 18 and is fed back to the computation control device 16, and the actuator operating pressure applied to the actuator 11 of the valve body 10 is controlled through the mediation of the electro-pneumatic conversion control device 17. As a result, without there being a stroke position detecting device installed on the valve body 10, or without a pressure detector left attached to the pipe passage L1, water hammerless opening can be achieved, and once the optimum conditions on water hammerless valve opening (that is, the conditions on the control of the actuator operating pressure Pa) for the subjected pipe passage L1 is determined, the vibration sensor 18 and computation control device 16 can be removed so that they can be used for other pipe passages, thus making it extremely advantageous economically.

Furthermore, in accordance with the water hammerless opening device for the fluid passage of the present invention, a vibration sensor 18 is installed in the vicinity of the valve body 10 on the pipe passage under an actual operating condition, and the valve body 10 is actually operated for opening/closing by applying the prescribed 2-step actuator operating pressure Pa to the actuator 11 of the valve body 10 from the electro-pneumatic conversion device 20 so that an optimum value of the step operating pressure Ps' of the afore-mentioned 2-step actuator operating pressure Pa is determined through the actual operation of the valve body 10, and the determined actuator operating pressure Pa is stored by the storage device of the electro-pneumatic conversion device 20. As a result, it is possible to abruptly open the valve body 10 both reliably and promptly and without causing a water hammer on the fluid passage by using the actuator operating pressure Pa of the electro-pneumatic conversion device 20.

In addition, selection and setting (tuning) of the afore-mentioned 2-step actuator operating pressure Pa can be easily performed through actual operation of the valve body 10 over 5~6 times. Also, by applying the actuator operating pressure Pa, having the appropriate step operating pressure Ps', to the actuator 11, the amplitude of pressure vibration at the time the valve body 10 is actually opened for the first time can be suppressed to a lower value, thus making it possible to accurately determine in advance what is the optimum value of the afore-mentioned actuator operating pressure Pa without adversely affecting the pipe passage.

Furthermore, by utilizing a personal computer, it is possible to perform selection and setting (tuning) of the afore-mentioned 2-step actuator operating pressure Pa both extremely easily and promptly, and also so that the water hammerless opening device is manufactured at lower cost.

BRIEF DESCRIPTION OF DRAWINGS

FIG. 3 is a graph illustrating the relationship between an input signal I (input voltage V) and an output pressure Pa (kgf/cm·G) of the electro-pneumatic conversion device 5.

FIG. 5 is a graph illustrating how the internal pressure P1 of the pipe passage changes at multi-step type opening (Pa=0→2.5→5 kgf/cm·G) in the case where tank pressure (the internal pressure P1 of the pipe passage) is made to change, wherein (a) shows the case where the internal pressure P1 of the tank=0.245 MPa·G, (b) P1=0.255 and (c) P1=0.274 respectively.

LIST OF REFERENCE CHARACTERS AND NUMERALS

Figure 1:
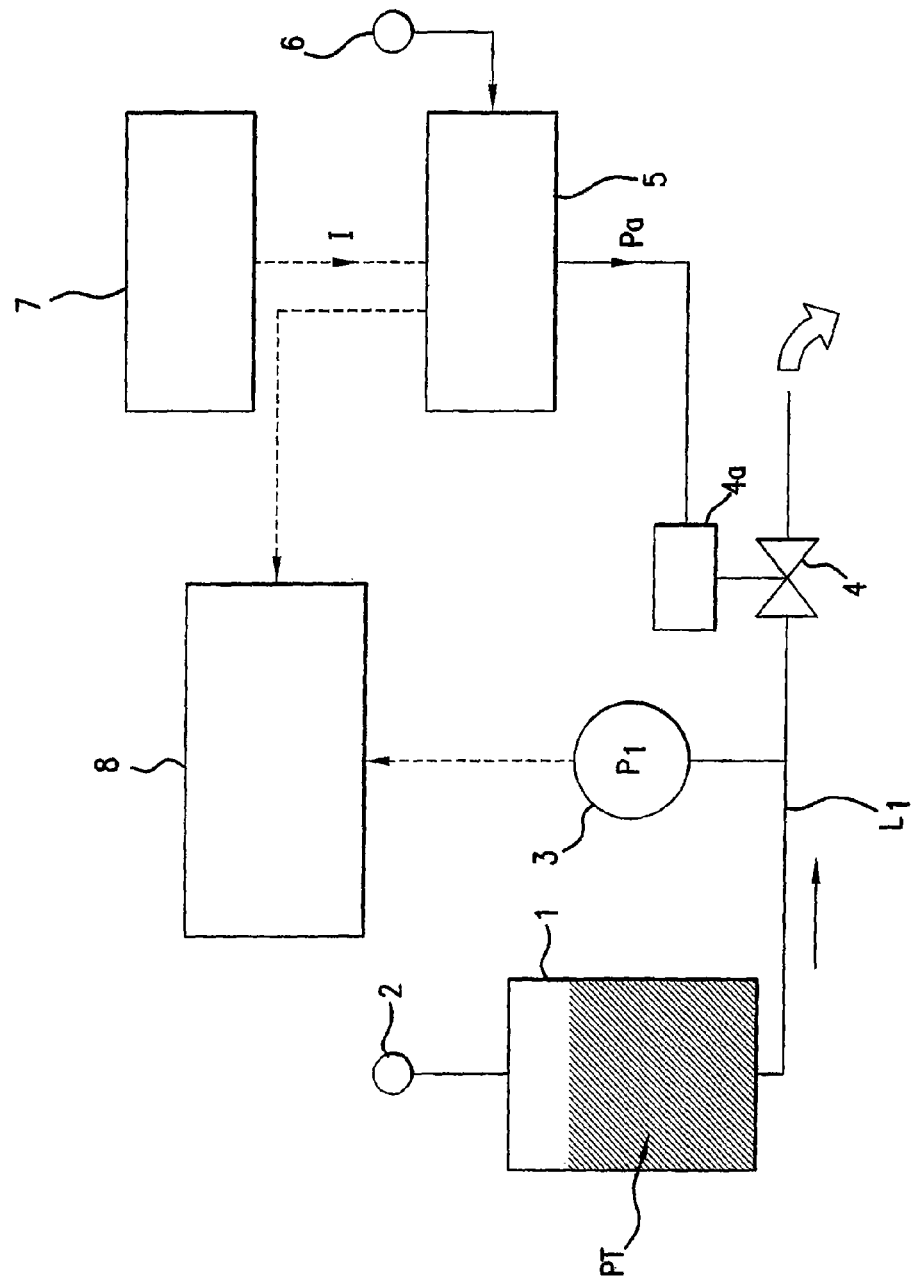
FIG. 1 is a circuit diagram of the testing device used for detecting the occurrence of a water hammer on the fluid passage.

PT Internal pressure of a water tank
L1 Pipe passage on the upstream side of a valve
P1 Internal pressure of a pipe passage
Pa Actuator operating pressure
Pao Air supplying pressure
ΔG Valve stroke
S Valve opening/closing command signal
1 Water tank
2 Source for pressurizing a water tank
3 Pressure sensor
4 Valve
4a Actuator
5 Electro-pneumatic conversion device
6 Valve driving gas source
7 Signal generator
8 Storage oscilloscope
10 Valve body
11 Actuator
16 Computation control device
17 Electro-pneumatic conversion control device
18 Vibration sensor
19 Tuning box
20 Electro-pneumatic conversion device
T Opening time detecting signal
P1 Pressure detecting signal
PM Permissible pressure rising value setting signal
Pr Vibration detecting signal
Prm Permissible upper limit vibration pressure setting signal
Ps Step pressure setting signal
Ts Step pressure holding time setting signal (Opening time setting signal)
Sc Control signal
Se Actuator operating pressure control signal
So NO-NC switching signal for a valve
t Step pressure holding time
Ps' Step operating pressure
A0 Fluid supply system
B0 Single wafer processing cleaner
W Wafer
A·B·C·D Chemical solutions to be mixed

DETAILED DESCRIPTION OF THE INVENTION

In order to investigate how a water hammer is caused in the liquid supply system of semiconductor manufacturing equipment, the inventors of the present invention have observed pressure changes in the fluid flow passage at the time when the flow passage is switched from full closing to full opening by employing a pneumatic pressure operating diaphragm. FIG. 1 is a circuit diagram of the testing device employed for the afore-mentioned investigation. Referring to FIG. 1, 1 designates a water tank, 2 is a source for pressurizing the water tank, 3 is a pressure sensor, 4 is a valve, 5 is an electro-pneumatic conversion device, 6 is a valve driving gas source, 7 is a signal generator and 8 is a storage oscilloscope.

The afore-mentioned water tank 1, having a capacity of 30 liters, is a hermetically sealed structure and stores about 25 liters of the fluid (water of 25° C.) therein. Also, the water tank 1 is pressurized by N2 from the pressurizing source 2, and the pressurization can be adjusted as desired within the range of 100~300 KPaG.

The afore-mentioned pressure sensor 3 is capable of detecting water pressure on the upstream side of the valve 4 with high sensitivity. A diffusion semiconductor type pressure sensor is employed in the testing device.

A diaphragm type pneumatic valve is used for the afore-mentioned valve 4, and specifications thereof are as follows: fluid inlet pressure 0.1 MPa, fluid outlet pressure 0.3 MPa, fluid temperature 10~100° C., the CV value 0.27, operating air pressure 3~0.6 MPa, materials of liquid-contacting parts (PTFE for the valve body and PTFE for the diaphragm), and the inside diameter of the passage is 4 mm. Specifically, the valve 4 is a pneumatically operating diaphragm valve whose valve body is a normally-closed (N.C.) type synthetic resin made diaphragm. The diaphragm valve body rests on the valve seat all of the time due to the elastic force of a spring (not shown in the figure) so that the valve is maintained in a closed state. While the actuator 4a is operated by the supply of operating pneumatic pressure, the result is the diaphragm valve body moving away from the valve seat and maintaining a state in which the valve is kept open. Accordingly, to open the normally-closed type pneumatically operating type diaphragm valve, it is required that operating pneumatic pressure be supplied to the actuator 4a. According to the present invention, it goes without saying that a normally-closed type pneumatically operating diaphragm valve can be replaced by a normally-open (N.O.) type pneumatically operating diaphragm valve. In such a case, the normally-open type valve is maintained in a state of being closed by raising the operating pneumatic pressure supplied to the actuator 4a.

Figure 2A:
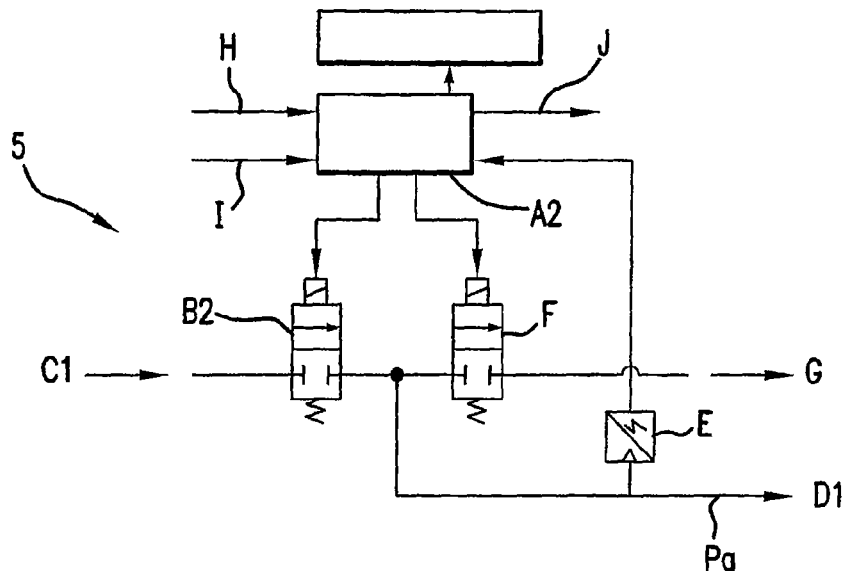
FIG. 2 is an explanatory drawing to illustrate an electro-pneumatic conversion device used for the testing device, wherein (a) is a basic block diagram, and (b) is a block diagram.
Figure 2B:
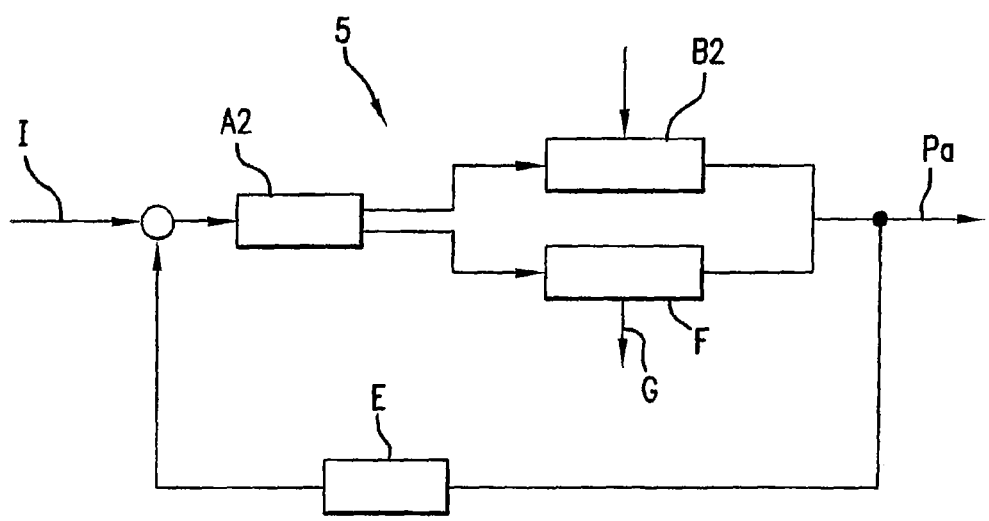

The afore-mentioned electro-pneumatic conversion device 5 is used to supply driving pressure (pneumatic pressure), corresponding to the input signal for directing the degree of valve opening, to the actuator 4a for the valve 4. As part of the testing device of FIG. 1, the electro-pneumatic conversion device 5, which is constituted as shown in FIG. 2, is employed. In particular, when the input signal I is inputted to the control circuit A2, an air supply electromagnetic valve B2 opens so that a part of the supply pressure C2 is supplied to the actuator 4a of the valve 4 as an output pressure Pa through the air supply electromagnetic valve B2. The output pressure Pa is fed back to the control circuit A2 through the mediation of the pressure sensor E, thus an operation for correction is effected until the outputted pressure Pa reaches the output pressure Pa corresponding to the input signal I. Referring to FIG. 2, F designates an exhaust electromagnetic valve, G is an exhaust, H is a power source, and J is an output signal corresponding to the input signal I. The output signal J (that is, an input signal I) is inputted to the storage oscilloscope 8 as the input voltage as described later.

FIG. 3 is a diagram illustrating the relationship between the value of the input signal I (input voltage V) of the afore-mentioned electro-pneumatic conversion device 5 and the output pressure Pa. FIG. 3 shows that the valve 4 is held in a state of full opening when the input voltage is 5V (operating air pressure P=approximately 5 kgf/cm·G).

A compressor is employed for the afore-mentioned valve operating air source 6 to supply gas with the prescribed pressure. And, the afore-mentioned signal generator 7 generates the input signal I, and the like, to the electro-pneumatic conversion device 5, and the like, so that the desired voltage output is outputted to the electro-pneumatic conversion device 5 as the input signal I. Furthermore, the pressure detecting signal P1 (voltage V), in the pipe passage L1 on the upstream side from the pressure sensor 3, and the input signal I (input voltage V) to the electro-pneumatic conversion device 5 are inputted to the afore-mentioned storage oscilloscope 8 in order to observe and record the changes in the pressure P1 in the pipe passage L1, the changes in the input signal (input voltage V), and the like. The storage oscilloscope 8, which has its time-axis graduated in 500 m sec/1, is employed in the testing device.

Figure 4B:
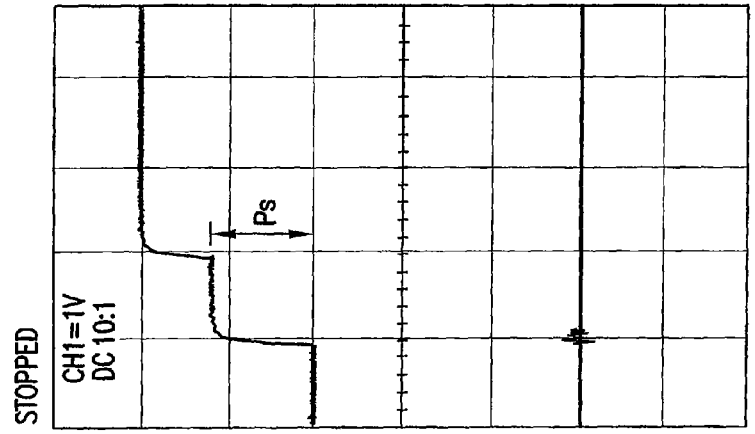
FIG. 4 is a graph illustrating multi-step opening in which the internal pressure P1 of the pipe passage 1 is made constant, and to illustrate the state of vibration changes in the pipe passage L1 on the upstream side of the valve in the case where the supply pressure Pa to the actuator is changed, wherein (a) shows the case where Pa is opened directly from 0 kgf/cm·G to 5 kgf/cm·G, and (b) shows the case where Pa is changed from 0 kgf/cm·G to 3.1 kgf/cm·G and then to 5.0 kgf/cm·G.
Figure 4A:
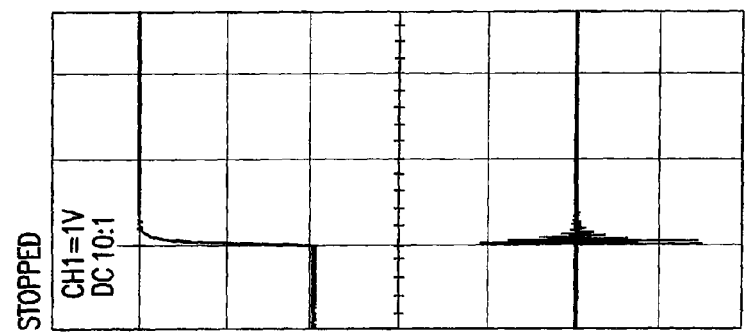

Referring to FIG. 1, the internal pressure PT of the water tank 1 is held at a specified pressure of 0.172 MPa·G, and the operating pressure Pa of 0.490 MPa·G is supplied to the actuator 4a, thus making the valve 4 move to a state of full opening from a state of full closing. In this case, the inside diameter of the pipe passage L1 was 4.0 mm, the length approximately 1.0 m, and the flow rate Q of water was approximately 3.45 liters/min. FIG. 4 shows changes in the supply air pressure Pa to the actuator 4a of the valve 4 and in the internal pressure P1 of the pipe passage L1 on the upstream side observed by the storage oscilloscope. As apparent from FIG. 4(*a*), changes in vibration output, with the amplitude of approximately maximum 12V, were shown when the valve 4 was fully opened through the process of 0 (fully closed)→0.490 MPa·G (fully opened).

On the other hand, in the case where supply pressure Pa is made to change as 0 (fully closed)→0.29 MPa·G (mid-position or intermediate position)→0.490 MPa·G (fully opened) (FIG. 4(*b*)), nearly no changes in the vibration of the pipe passage were observed, thus demonstrating that the water hammer effect can be perfectly prevented.

In particular, it is apparent that if the internal pressure P1 of the pipe passage L1 is kept constant, then (1) the fluid passage can be opened, without causing a water hammer, in about 500~1000 m sec by opening the valve instantaneously from a state of full closing to a certain degree of opening (i.e., mid-position or intermediate position), and then making the valve move to a state of full opening after a short lapse of time, and (2) the water hammer cannot be prevented if the afore-mentioned initial halt position of the valve body, that is, the degree of valve opening, is either greater or smaller than a specific value.

FIG. 5(*a*), (*b*), (*c*) show pressure changes in the pipe passage on the upstream side of the valve 4 when the step pressure Ps is made to change from 0.245 MPa·G to 0.255 MPa·G to 0.274 MPa·G, and the pressure Pa of the actuator is made to change as 0→0.245→0.49 MPa·G, to open the valve 4 fully in 100 m sec.

Figure 6:
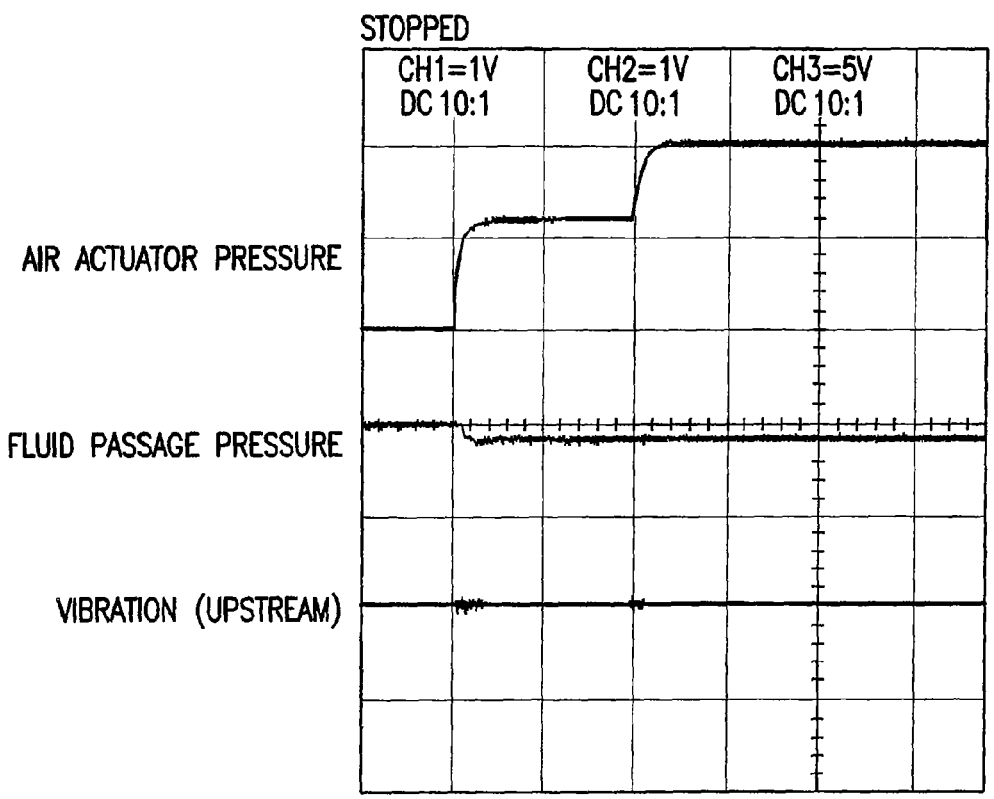
FIG. 6 is an enlarged view of FIG. 5(c).

FIG. 6 is an enlarged view of the afore-shown FIG. 5(*c*). It becomes apparent that vibration of the pipe passage L1 on the upstream side can be made nearly zero by fully opening the valve 4 with a 2-step operation to raise the pressure Pa of the actuator in the order of 0→0.294→0.490 MPa·G in about 1000 m sec.

Figure 7A:
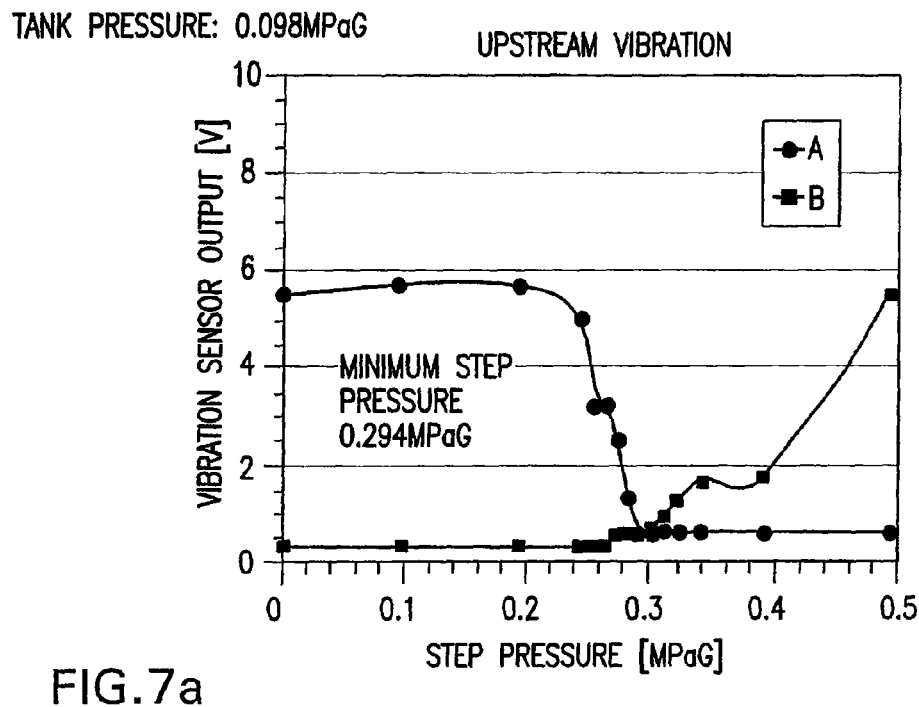
FIG. 7 is a graph illustrating the relationship between the internal pressure PT of the tank and the actuator operating pressure Pa so as to prevent a water hammer using multi-step valve closing, wherein (a) shows the case where the internal pressure of the tank=0.098 MPaG, (b) 0.196 MPaG and (c) 0.294 MpaG, respectively.
Figure 7B:
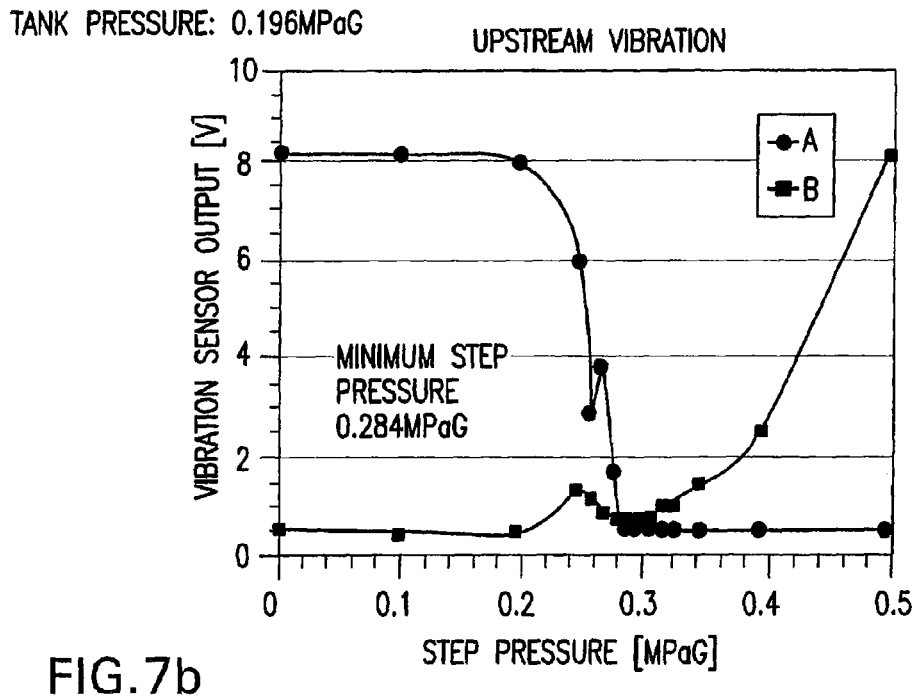
Figure 7C:
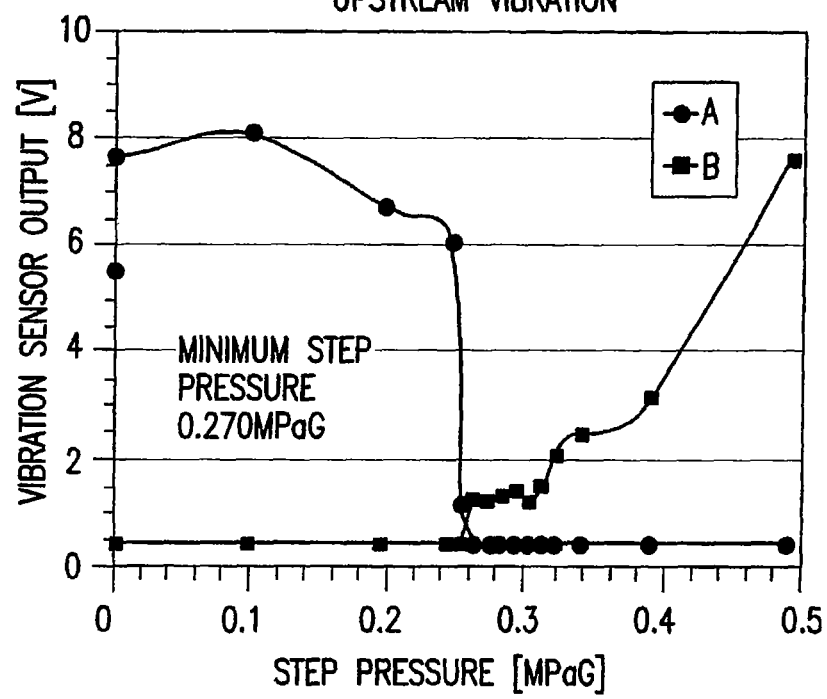

FIG. 7(*a*), (*b*), (*c*) show the relationship observed between the step pressure Ps and the vibration pressure in the pipe passage L1 on the upstream side in the cases where the internal pressure of the tank is made to be 0.098, 0.196 and 0.294 MPa·G, respectively. Thus, it becomes apparent that there exists a step pressure Ps that minimizes vibration pressure for each case. In these cases, holding time of the step pressure is 1000 m sec.

Figure 8:
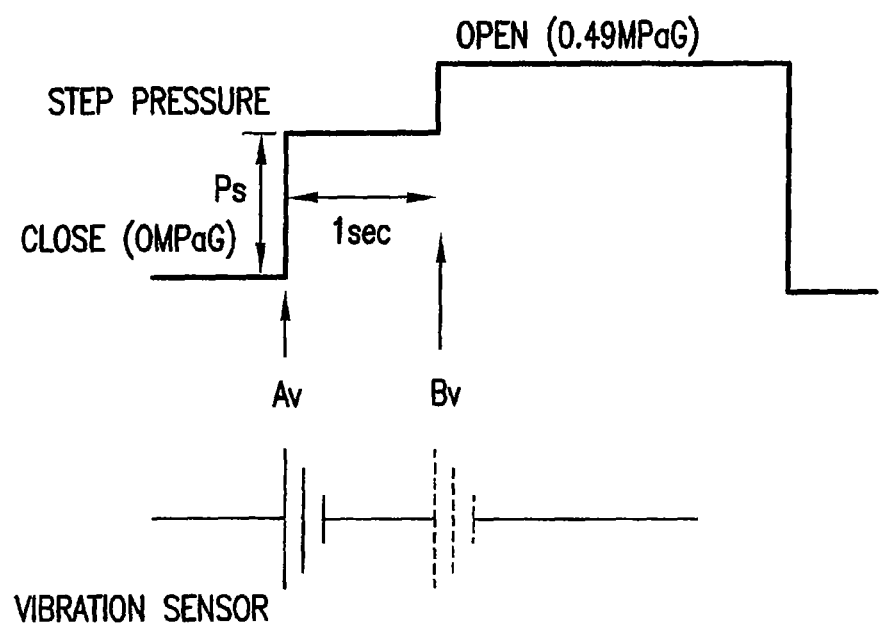
FIG. 8 is an explanatory drawing illustrating the relationship between the actuator operating pressure Pa and the time of detecting vibration in FIG. 7.

FIG. 8 is an explanatory drawing of the supply pressure Pa to the actuator 4a in the test of the afore-shown FIG. 7, and shows the relationship of positioning of the step pressure Ps and the first step (point A) and the second step (point B).

The First Embodiment of a Water Hammerless Opening Device

Figure 9:
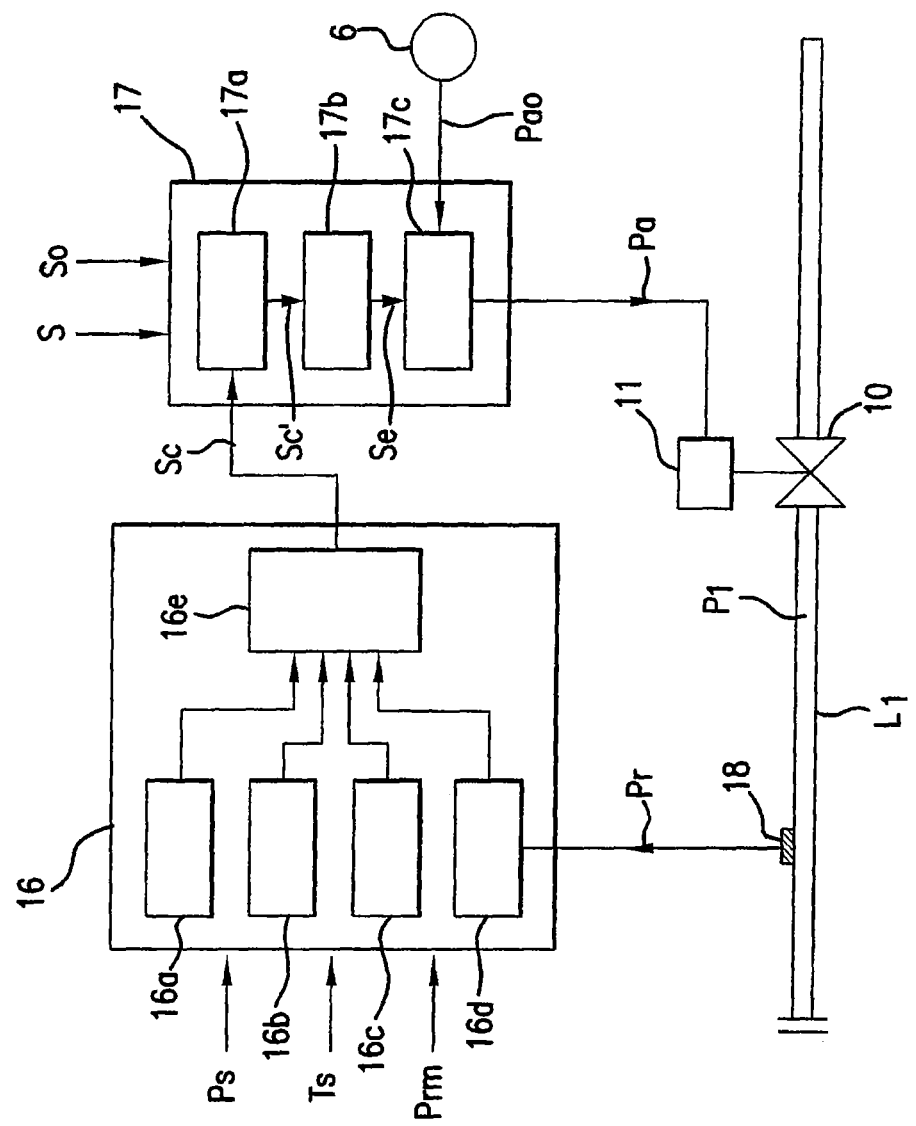
FIG. 9 is a whole block diagram of a first embodiment of the water hammerless opening device for the fluid passage according to the present invention.

FIG. 9 illustrates the basic block configuration of the first embodiment of a water hammerless opening device for the fluid passage according to the present invention. The device is mainly used when it is found difficult to mount a pressure detector, such as 3, on the pipe passage L1 on the upstream side that has been already installed, or to mount a valve stroke detector (a position detector) on the valve body 10.

Figure 10A:
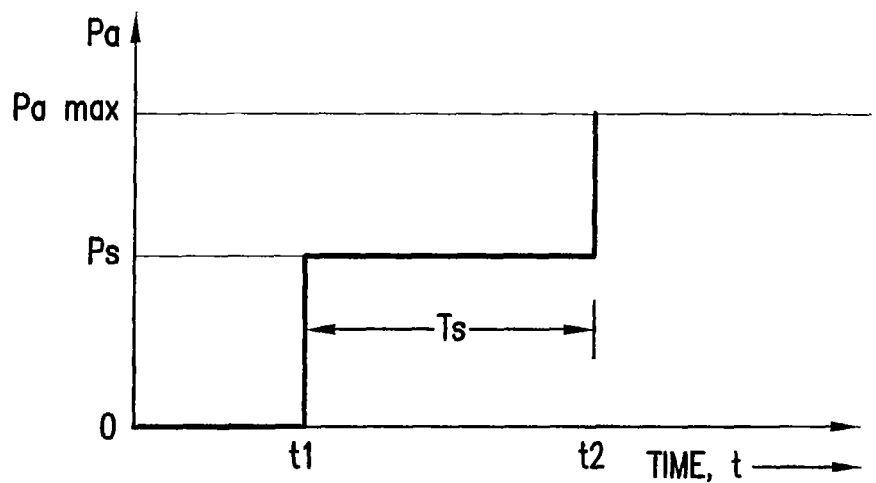
FIG. 10 is an explanatory drawing illustrating the control of the actuator operating pressure Pa (FIG. 10a) and one example of the occurrence of vibration (FIG. 10b) using the water hammerless opening device of FIG. 9.
Figure 10B:
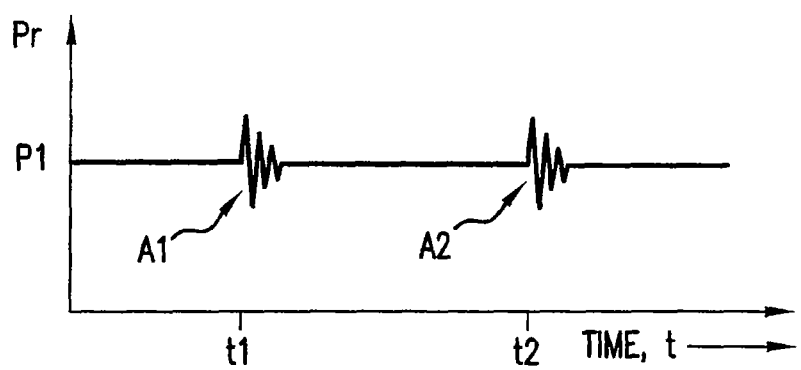

Referring to FIG. 9 and FIG. 10, the water hammerless opening device is made by assembling a valve body 10, an actuator 11, an electro-pneumatic conversion control device 17, a computation control device 16 that makes control possible over the step switching of the actuator operating pressure Pa, and the pressure holding time Ts after having been switched and the like. A vibration sensor 18 is removably fixed to the pipe passage L1 on the upstream side so that the conditions of opening of the valve body 10, which make water hammerless opening possible, are set and stored beforehand by appropriately selecting step switching of the actuator operating pressure Pa (switching from 0 to the step pressure Ps in FIG. 10(a)) applied to the actuator 11 of the valve body 10 and also the holding time Ts of the step pressure Ps.

Figure 16:
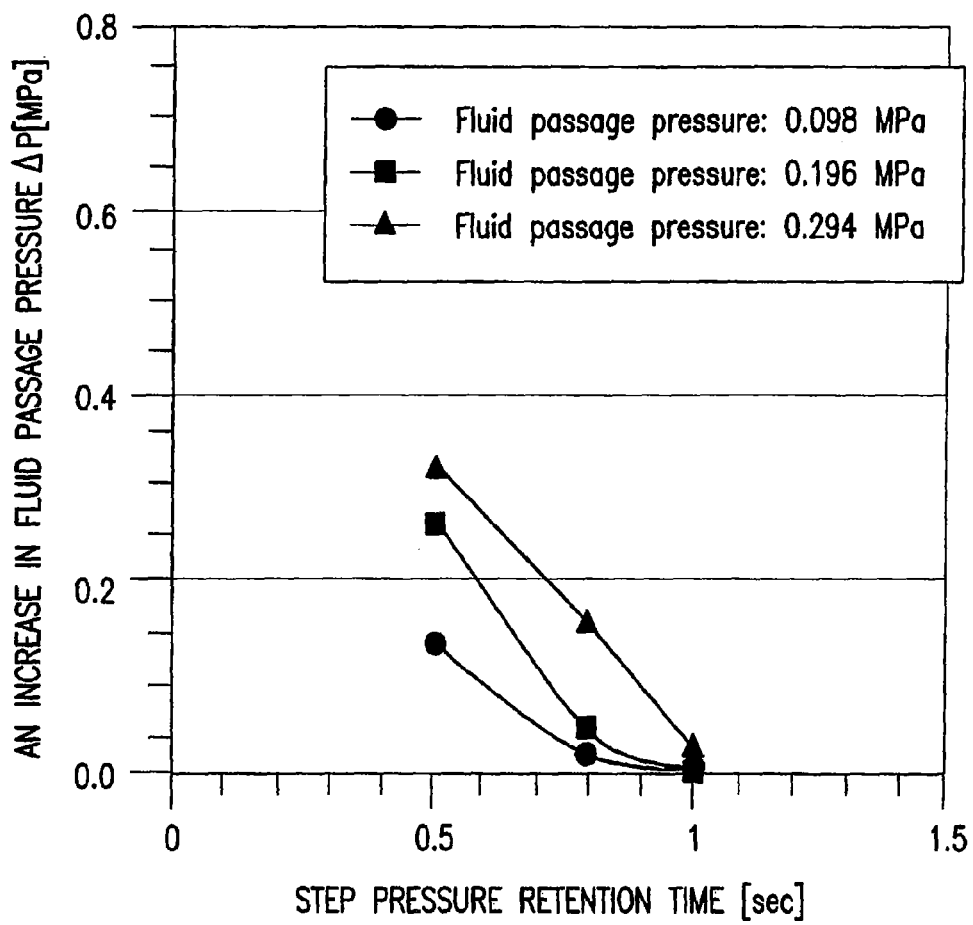
FIG. 16 is a graph illustrating the relationship between the step pressure holding time t of the driving pressure Pa in steps and the pressure rising value ΔP.

More specifically, with respect to FIG. 9 and FIG. 10, 16 designates the computation control device, 17 is the electro-pneumatic conversion control device, 18 is a vibration sensor, 6 is a valve driving gas source, 10 is a valve body and 11 is an actuator. The driving pressure Pao (approximately 0.6 MPa in this embodiment) from the valve driving gas source is converted to the step operating pressure Pa as shown in FIG. 10(a) by the electro-pneumatic conversion control device 17, and then is applied to the actuator 11.

The actuator operating pressure Pa applied to the actuator 11, and its holding time Ts, are controlled by the control signal Sc from the computation control device 16 determined beforehand by the operating test wherein opening of the valve body was conducted for each pipe passage L1 on the upstream side of the valve in a manner described later. The vibration sensor 18 and computation control device 16 are removed from the pipe passage L1 on the upstream side upon completion of the selection of the afore-mentioned control signal Sc by employing the operating test for opening the valve body 10.

The afore-mentioned computation control device 16 is equipped with a setting circuit 16a for receiving the step pressure setting signal Ps, a setting circuit 16b for receiving the pressure holding time setting signal Ts, a setting circuit 16c for receiving the permissible upper limit vibration pressure setting signal Prm, a pipe passage vibration pressure detecting circuit 16d, a comparison computation circuit 16e, and the like. The vibration detecting signal Pr, by which changes in the internal pressure P1 detected by the vibration sensor 18 at the time of opening of the valve body 10 are considered, the step pressure setting signal Ps, the step pressure holding time setting signal Ps, and the permissible upper limit vibration pressure setting signal Prm are inputted, respectively, to the computation control device 16.

The vibration detection signal Pr and the permissible upper limit vibration pressure setting signal Prm are compared at the comparison computation circuit 16e. When a difference is found between them, as described later, the step pressure setting signal Ps is corrected so that the control signal Sc includes the corrected step pressure setting signal Ps and the holding time setting signal Ts. The control signal Sc is outputted to the data storing part 17a of the electro-pneumatic conversion control device 17.

Also, the afore-mentioned electro-pneumatic conversion control device 17 is equipped with a data storage part 17a, a signal conversion part 17b (i.e., a signal generator 7), an electro-pneumatic conversion part 17c (i.e., an electro-pneumatic conversion device 5), and the like. The actuator operating pressure Pa supplied to the actuator 11 is switched and converted in steps, as shown in FIG. 10(a), by the actuator operating pressure control signal Se from the signal conversion part 17b that is inputted to the electro-pneumatic conversion part 17c. The switching signal So corresponding to the valve opening/closing command signal S and the operating situation (NO=normally open or NC=normally closed) of the valve body 10 is inputted to the electro-pneumatic conversion control device 17.

Referring to FIG. 9, firstly a vibration sensor 18 is fixed to the pipe passage. Next, the appropriate step pressure setting signal Ps, step pressure holding time setting signal Ts, and permissible upper limit vibration pressure setting signal Prm, are inputted to the computation control device 16, and the valve body switching signal So of the electro-pneumatic conversion control device 17 and the actuator operating fluid supply pressure Pao are appropriately set.

Then, by inputting the valve opening/closing command signal S, the actuator operating pressure Pa, for example, like a form shown in FIG. 10(a), is supplied to the actuator 11 of the valve body 10. Now, when the actuator operating pressure Pa is raised from 0 to Ps at time t1, the fluid passage of the valve body 10 is opened up to its mid-position, and the valve body 10 is in the state of full opening when the actuator operating pressure Ps is made to be Pamax at time t2 when, further, the set holding time has elapsed.

Meantime, if the internal pressure P1 of the pipe passage L1 changes due to the occurrence of a water hammer, the changes are detected by the vibration sensor 18 and the vibration detecting signal Pr is inputted to the computation control device 16. In the computation control device 16, the detecting signal Pr and permissible upper limit vibration pressure setting signal Prm are compared, and when it is found that there occurs no vibration or the vibration is within tolerance at a position A1 (time t1), but the vibration exceeds tolerance Prm at a position A2 (time t2), the step pressure setting signal Ps is corrected to raise the actuator operating pressure a little so that the corrected step pressure setting signal Ps, and corresponding holding time setting signal Ts, are outputted as the control signal Sc from the computation control device 16 to the electro-pneumatic conversion control device 17, and the same operating tests for opening the valve body are thereafter repeated.

Conversely, when it is found that vibration occurring at a position A1 (time t1) exceeds the permissible upper limit vibration pressure setting signal Prm, the setting signal Ps is corrected to lower the afore-mentioned step pressure setting signal Ps a little, and outputted as the control signal Sc from the computation control device 16 to the electro-pneumatic conversion control device 17, and the same operating tests for opening the valve body 10 are repeated thereafter.

Through repeating operating tests as described in the above paragraphs [0064] and [0067], the intermediate operating pressure Ps (the step pressure setting signal Ps) for the actuator 11, required for water hammerless opening of the pipe passage L1 equipped with a vibration sensor 18, is selected for the specified step pressure holding time setting signal Ts (the valve opening time Ts). The selected control signal Sc, by which the optimum step pressure setting signal Ps and holding setting time Ts will not cause a water hammer, is stored in the data storage part 17a of the electro-pneumatic conversion control device 17, and the pipe passage L1 is opened from then on by controlling the actuator operating pressure Pa based on the stored control signal Sc.

In accordance with the embodiment in the afore-shown FIG. 9 and FIG. 10, the present invention is so made that the actuator operating pressure Pa is controlled in 2 steps. However, it goes without saying that the invention can be switched in 3 steps or 4 steps when necessary. Normally, the step holding time setting signal Ts is set between 0.5~1 second. It also goes without saying that the shorter the time Ts becomes, the more difficult it becomes to find the conditions for water hammerless opening.

The Second Embodiment of a Water Hammerless Opening Device

Figure 11:
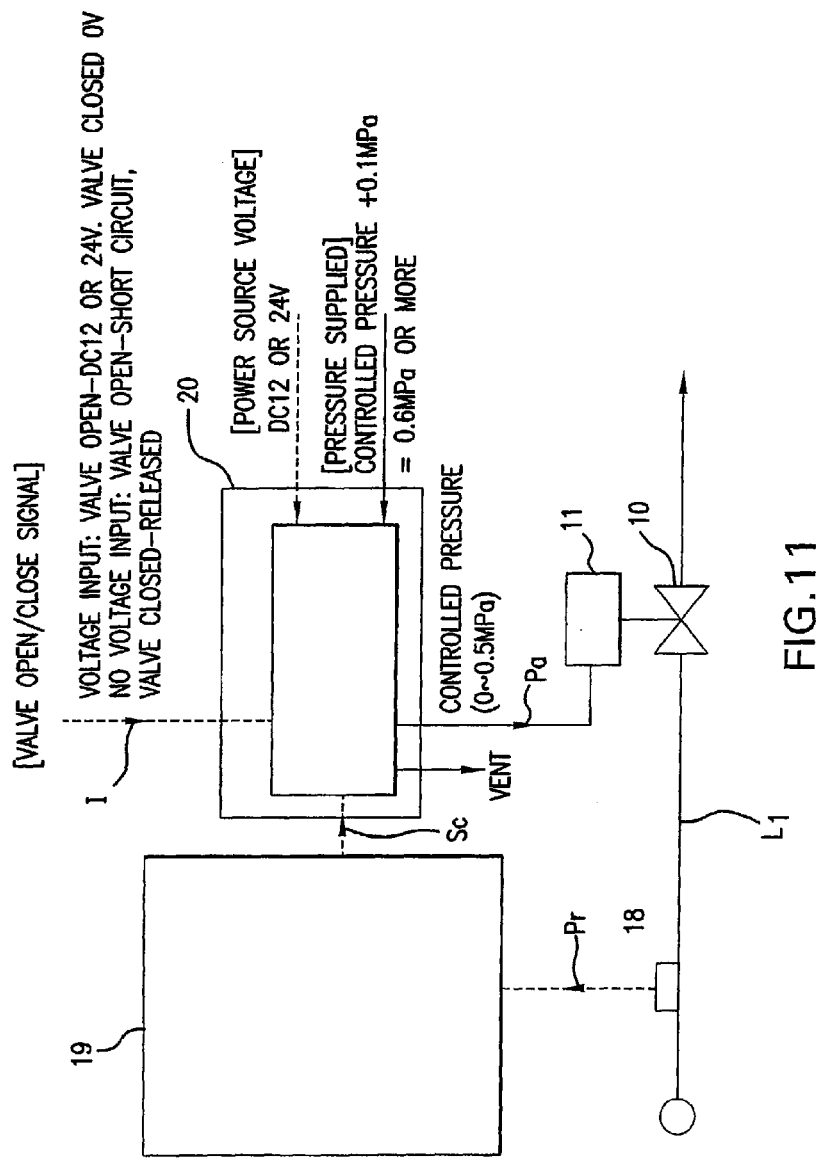
FIG. 11 is a whole system diagram of the water hammerless opening device with respect to a second embodiment according to the present invention.

FIG. 11 illustrates the second embodiment of the method of opening a fluid passage, and the water hammerless opening device for which the method is used, according to the present invention. In FIG. 11, L1 designates a pipe passage, 10 is a valve body, 11 is an air actuator, 18 is a vibration sensor, 19 is a tuning box and 20 is an electro-pneumatic conversion device. The basic configuration as a water hammerless opening device is almost the same as that of the first embodiment shown in FIG. 9.

Figure 15:
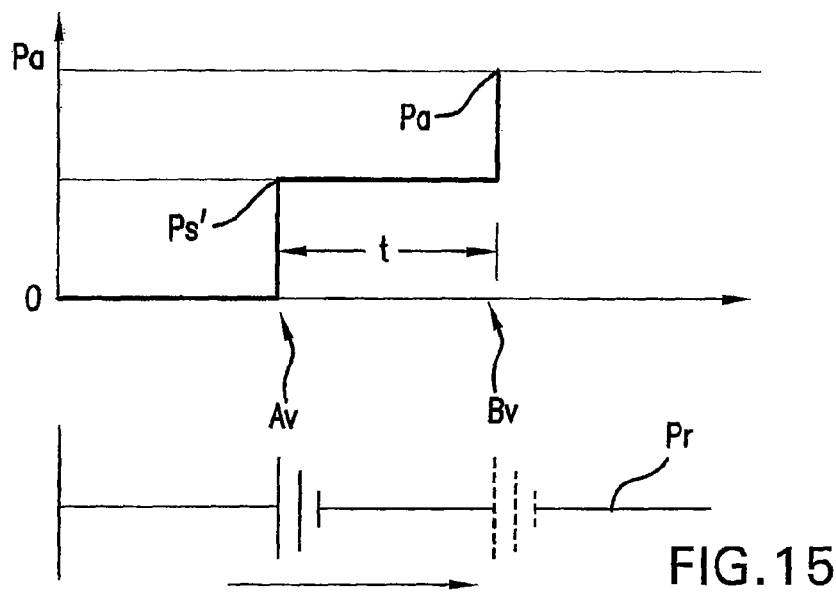
FIG. 15 is an explanatory drawing for the relationship between the driving pressure Pa and the vibration that occurred in auto-tuning operations.

The afore-mentioned tuning box 19 is for optimizing the actuator operating pressure Pa in 2 steps supplied to the air actuator 11 using the vibration detecting signal Pr, provided by the vibration sensor 18 mounted on the upstream side of the valve body 10 and which is inputted as a feedback signal. The tuning box is for detecting the occurrence of a water hammer from the feedback signal Pr and is for outputting the control signal Sc, for the actuator operating pressure, to the electro-pneumatic conversion device 20. Specifically, as described later, optimal values for the step operating pressure Ps' of the actuator operating pressure Pa and the step operating pressure holding time t, as shown in FIG. 15, are computed. Thus, the control signal Sc may be outputted to the electro-pneumatic conversion device 20, which will make the actuator operating pressure Pa output from the electro-pneumatic conversion device 20 to the actuator 11.

The tuning box 19 is equipped with a selector switch for switching the control signal Sc corresponding to the type of operation (N.O. or N.C.) of the air actuator 11 of the valve body 10.

Figure 12:
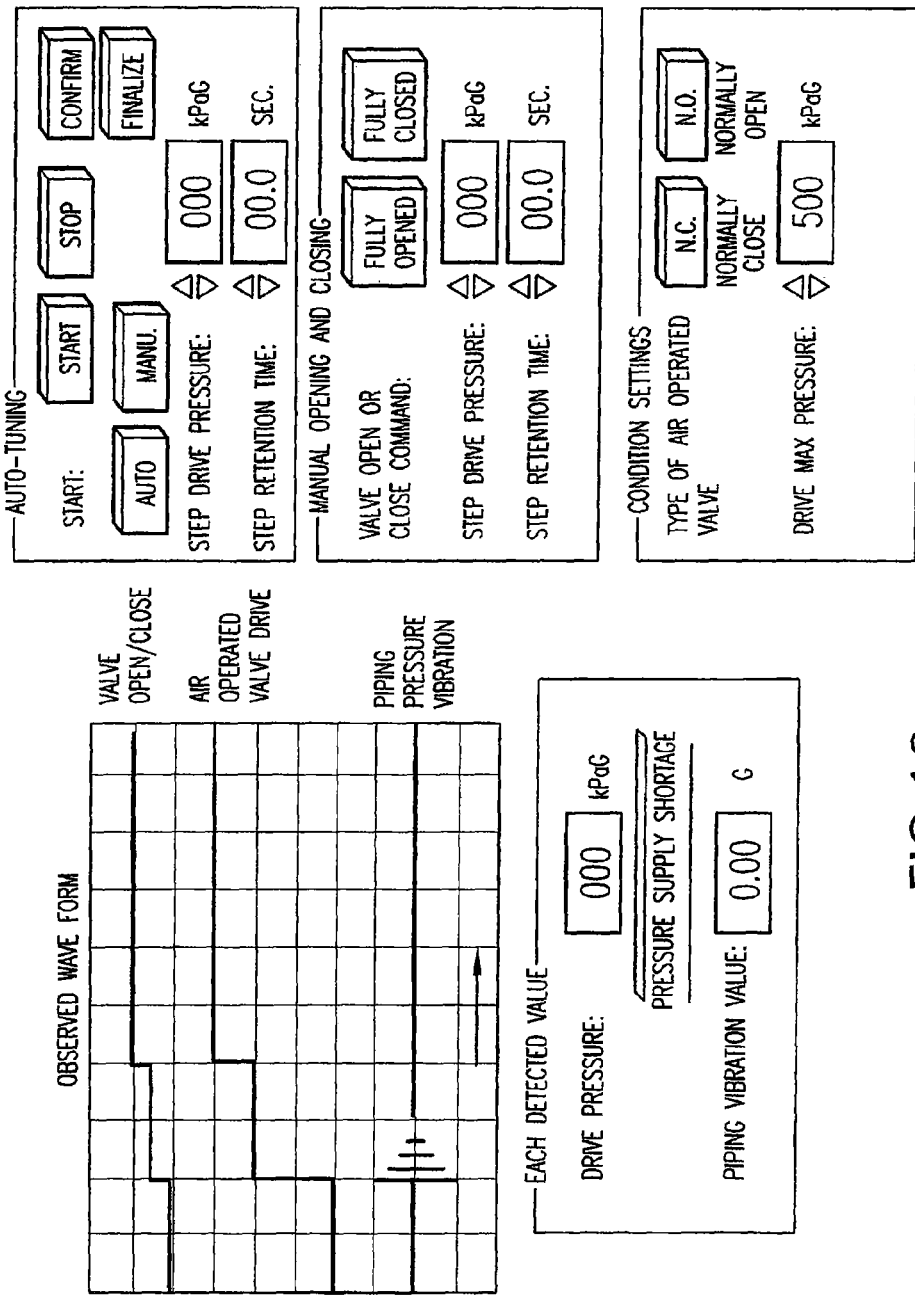
FIG. 12 is an overview of a PC screen display of a tuning box.

FIG. 12 shows one example of the PC screen display that forms a major part of the tuning box. The screen display is constituted so that a state of opening/closing of the valve body 10, the actuator operating pressure Pa to the air actuator 11, circumstances of the vibration of the pipe passage L1, the step operating pressure Ps' and pipe vibration values, the condition setting for auto-tuning, the condition setting for manual opening/closing, the operation type of the valve body 10, and other information can be displayed on the screen.

Figure 13:
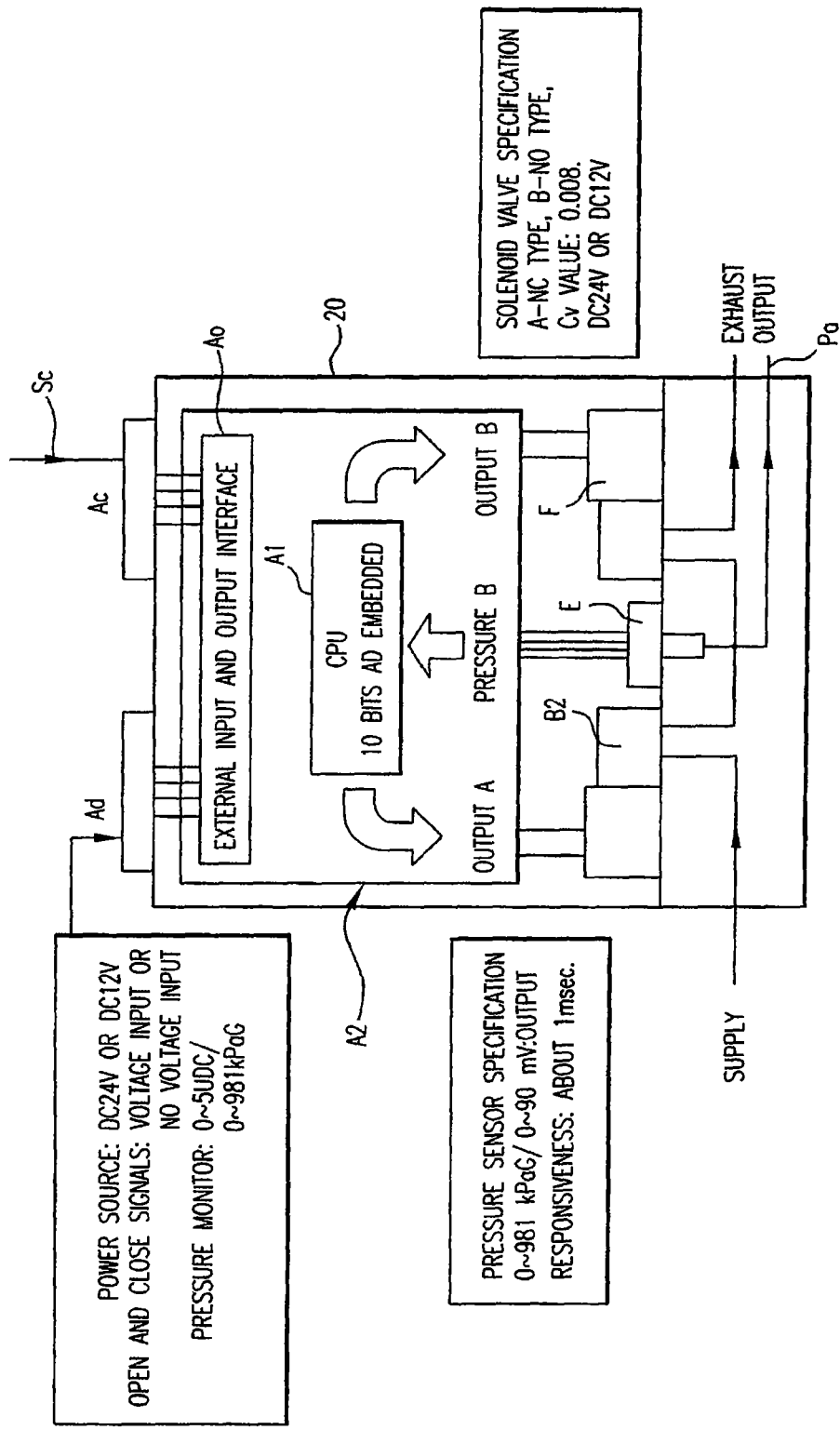
FIG. 13 is a schematic block diagram of an electro-pneumatic conversion device.

The signal converter and electro-pneumatic converter are combined to make the afore-mentioned electro-pneumatic conversion device 20. As shown in FIG. 13, the electro-pneumatic conversion device 20 comprises an air inlet electromagnetic valve B2, an air outlet electromagnetic valve F, a pressure sensor E, a control circuit A2, and others. Basically, the configuration is almost the same as those shown in FIGS. 2(a) and (b).

In particular, an air pressure higher than 0.6 MPa is supplied to the air inlet electromagnetic valve B2, and an air pressure of 0~0.5 MPa is outputted to the actuator 11 as the actuator operating pressure Pa. The control circuit A2 of the electro-pneumatic conversion device 20 is equipped with the substrate A1, the outside input/output interface A0, and others. The outside input/output interface A0 is equipped with two connectors Ac and Ad. A power supply source (DC24 or 12V), an opening/closing signal I (voltage input or non-voltage input) and a pressure monitor (0~5 DCV·0~981 KPaG) are connected to the connector Ad, while the tuning box 19 is connected to the connector Ac.

Figure 14:
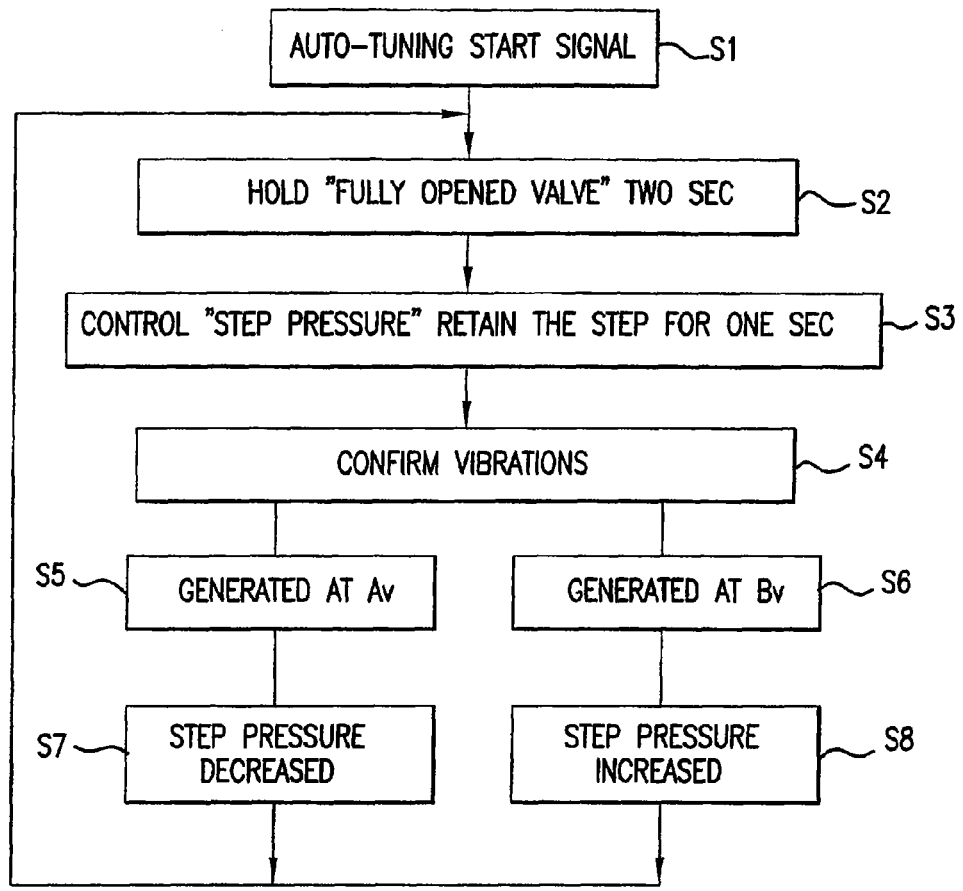
FIG. 14 is a flow chart of auto-tuning operations.

FIG. 14 shows the implementation flow of auto-tuning in the second embodiment. FIG. 15 shows the relative relationship between the actuator operating pressure Pa applied to the actuator 11 and the occurrence of vibration. As in the case of FIG. 10, the 2-step actuator operating pressure, as shown in FIG. 15, is applied as the actuator operating pressure Pa.

Referring to FIG. 14, and as shown in FIG. 11, the vibration sensor 18 is fixed at a prescribed position of the pipe passage L1 (a position on the upstream side within about 1000 mm from the valve body 10, or preferably a position of 100~1000 mm away to the upstream side), and a tuning box 19 and an electro-pneumatic conversion device 20 are set, respectively. Next, the valve is held in a state of full closing for about 2 seconds (step S2) by the input (step S1) of the auto-tuning start signal, and then the actuator operating pressure Pa is applied in 2 steps for conducting control (step S3). As described later, the holding time t of the step operating pressure Ps' has been set between 0.5~1 sec.

The vibrations caused on the pipe passage L1, when the valve body 10 is opened, are detected and confirmed (step S4) by the vibration detecting signal Pr from the vibration sensor 18, and a check is made to see whether vibrations are caused at the point Av or at the point By (step S5, step S6). When it is found that vibrations are caused at the point Av, the step operating pressure Ps' of the actuator operating pressure Pa is reduced (step S7), while when it is found that the vibrations are caused at the point By, the afore-mentioned step operating pressure Ps' is raised (step S8).

The actuator operating pressure Pa having the optimum step operating pressure Ps', with which no vibration is caused, is eventually obtained by repeating the control of opening of the afore-mentioned valve body 10 (normally over 2 or 3 to 15 times). Then the valve body 10 is made to open by inputting the control signal Sc obtained through auto-tuning of the electro-pneumatic conversion device 20 to output the actuator operating pressure Pa in 2 steps, which completely prevents the vibrations.

The shorter is set the step operating pressure holding time t of the 2-step actuator operating pressure Pa, applied at the time of the afore-mentioned auto-tuning, the better. However, when using a pneumatically operating actuator 11, it is desirable that the time t is less than 1 second. From FIG. 14 and FIG. 15, an illustration is given for the case where a normally closed type pneumatically operating diaphragm valve is employed, and the valve of the valve body 10 is closed and then made to open by supplying the actuator operating pressure Pa. However, it goes without saying that a water hammerless opening can also be achieved by employing a normally open type pneumatically operating diaphragm valve so that reducing the actuator operating pressure Pa in 2 steps opens the valve. In this case, it should be noted that adjustments of the step operating pressure Pa' of the actuator operating pressure Pa are the reverse of the case of when the afore-mentioned normally closed type pneumatically operating diaphragm valve is used. That is, when vibrations are caused at the time when the actuator operating pressure Pa is reduced in the first step, the step operating pressure Pa' is then raised, while when vibrations are caused at the time when the actuator operating pressure Pa in the second step is reduced, then the step operating pressure Pa' is lowered.

FIG. 16 illustrates the relationship between the step operating pressure holding time t and the pressure rising value ΔP(MPaG) when the pneumatic pressure operating valve (19.05 mm) is employed, with which inner capacity remains unchanged at the time when the valve is opened or closed, and 3 pipe passages with a liquid line of 0.098 MPa, 0.198 MPa and 0.294 MPa are opened with an operating pressure Pa having the actuator operating pressure Pa of 0 MPaG→40.294 MPaG→0.490 MPaG in 2 steps. It has been determined that if the step operating pressure holding time t is made to be more than 1 second, the pressure rise ΔP can reach nearly zero, and if t is made to be less than 0.5 second, the pressure rise ΔP goes up.

Upon completion of the afore-mentioned auto-tuning, when the control signal Sc, which allows water hammerless opening of the pipe passage L1 (that is, the control signal for outputting the actuator operating pressure in 2 steps which allows for water hammerless opening), is determined, then data of the afore-mentioned control signal Sc (that is, the operating pressure Pa) are transmitted to the electro-pneumatic conversion device 20 that stores the data separately. Thus, the tuning box 19 and the vibration sensor 18 are no longer necessary and may be removed from the system.

When it becomes necessary to urgently open the valve body 10, the 2-step actuator operating pressures Pa, which permit water hammerless opening, are outputted from the electro-pneumatic conversion device 20 to the actuator 11 of the valve body 10 by employing the data on the afore-mentioned control signal previously determined through auto-tuning.

With respect to the embodiment shown in FIG. 11, when the actuator operating pressure Pa (the step operating pressure Ps' and the holding time t thereof) is determined upon completion of the auto-tuning operation, data on the operating pressure Pa are transmitted to the electro-pneumatic conversion device 20; thus, the vibration sensor 18 and the tuning box 19 are completely removed thereafter from the system. However, it goes without saying that the tuning box 19 may be downsized so that it can be integrated with the electro-pneumatic conversion device 20.

Figure 17:
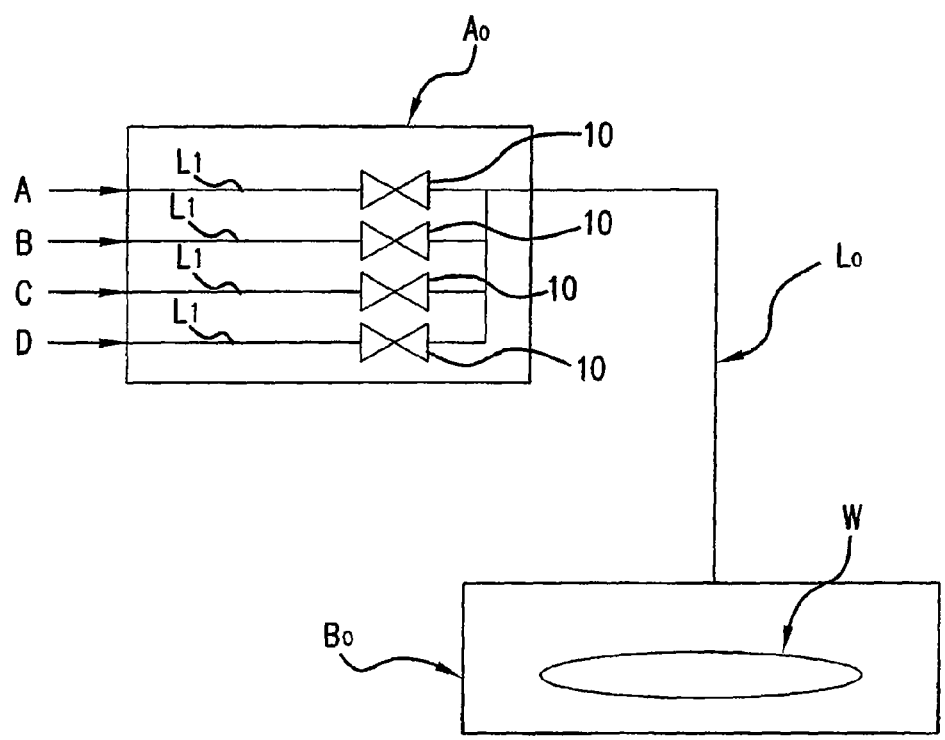
FIG. 17 is a system diagram illustrating the case where the chemical solution supply method according to the present invention is applied to a single wafer processing cleaner of semiconductor manufacturing equipment.

FIG. 17 is a system diagram illustrating how the method of supplying chemical solutions according to the present invention is applied to a single wafer processing cleaner that constitutes a semiconductor manufacturing facility. According to FIG. 17, A0 designates a fluid supply system, 10 are valve bodies installed in the fluid supply system A0, B0 is a single wafer processing cleaner, L0 is a pipe passage, W is a wafer, A is a mixed chemical solution (ozonized ultra-pure water·the concentration of ozone 2~3 ppm), B is a mixed chemical solution of hydrofluoric acid, hydrogen peroxide, ultra-pure water (mixing ratio 0.03:1:2), C is a mixed chemical solution of ammonium hydroxide, hydrogen peroxide, ultra-pure water (mixing ratio 0.05:1:5), and D is ultra-pure water. The fluid supply system A0 in FIG. 17 is constituted in the form like, for example, the afore-shown systems of FIG. 1, FIG. 9 or FIG. 11. The system of FIG. 17 is so constituted that, firstly, the valve of the valve body 10 is moved in the direction of valve opening through mediation of the actuator (not illustrated) by a given degree, and next, the valve is held as it is at the given degree of valve opening (i.e., mid-position or intermediate) for a short period of time, and then the valve is moved to the position of full opening so the valve body 10 is fully opened.

The constitution and action of the fluid supply system A0 are exactly the same as those in the systems of afore-shown FIG. 1, FIG. 9 or FIG. 11. Therefore, further explanation of these alternate embodiments is omitted. The cleaning process of a wafer W is that, first, cleaning is performed using the mixed chemical solution A, and next, the mixed chemical solution B is supplied, and then the mixed chemical solutions C and D are supplied in turn as the valve body 10 is switched through mediation of the actuator.

At the time the chemical solutions A, B, C and D are supplied, it is desirable that the pressure rise value in the pipe passage L1, occurring when the valve body 10 is opened, is kept within 10% of the pressure value before the valve is opened. In order that the pressure rise value is kept within the afore-mentioned 10% limit, some adjustments are made for the driving input value to the afore-mentioned actuator and also for the corresponding holding time. The pressure rise value in the pipe passage L0 can be kept within 10% of the steady state value by maintaining the pressure rise value in the pipe passage L1 within 10%. Furthermore, with respect to the embodiment discussed above, explanation is provided only for the upper limit of the pressure rise value at the time supplying of mixed chemical solutions A, B, C and D (or at the time of the valve being opened) is started. However, it goes without saying that there exists an upper limit for the pressure rise value for the pipe passage L1 at the time of halting the supply of mixed chemical solutions A, B, C and D (or at the time of the valve being closed). Each valve body 10 in FIG. 17 is operated for closing so that the afore-mentioned pressure rise value is kept within the set value.

FEASIBILITY OF INDUSTRIAL USE

The present invention is applicable not only to supply pipes for water, steam, and the like, used in industries, but is also applicable to supply pipes for household water/hot water. The present invention is also applicable to supply pipes for fluids (gases and liquids) used in semiconductor manufacturing plants, chemical plants, and the like. The present invention is particularly suited for application to chambers, wafer cleaning devices or various types of etching devices used for semiconductor manufacturing.

The invention claimed is:

1. A device for water hammerless opening of a fluid passage, comprising:
   (a) an actuator operating type valve installed on a fluid passage in a state of having a constant fluid pressure;
   (b) an electro-pneumatic conversion device equipped with a memory storage for storing a control signal Sc from a tuning box and disposed to supply a 2-step actuator operating pressure Pa to the actuator operating type valve;
   (c) a vibration sensor operable to detect vibration in the fluid passage caused by flow of fluid in the fluid passage, and the vibration sensor is removably fixed to the fluid passage on an upstream side of the actuator operating type valve; and
   (d) a tuning box disposed to receive as input a vibration detecting signal Pr detected through the vibration sensor and to output to the electro-pneumatic conversion device the control signal Sc to control a step operating pressure Ps' and a step retention time t of the 2-step actuator operating pressure Pa, wherein the tuning box uses the vibration detecting signal Pr to adjust the control signal Sc so that output from the electro-pneumatic conversion device of the 2-step actuator operating pressure Pa comprising the step operating pressure Ps' makes the vibration detecting signal Pr nearly zero so that the actuator operating type valve opens the fluid passage without causing a water hammer in the fluid passage when the 2-step operating pressure Pa is supplied to the actuator operating type valve.

2. A device for water hammerless opening of a fluid passage as claimed in claim 1, wherein the tuning box comprises a display screen that displays the step operating pressure Ps' and pipe vibration values of the fluid passage.

\* \* \* \* \*